United States Patent
Massey

(10) Patent No.: US 8,948,917 B2
(45) Date of Patent: Feb. 3, 2015

(54) SYSTEMS AND METHODS FOR ROBOTIC WELDING OF DRILL BITS

(75) Inventor: Alan J. Massey, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 1116 days.

(21) Appl. No.: 12/603,734

(22) Filed: Oct. 22, 2009

(65) Prior Publication Data

US 2010/0106285 A1    Apr. 29, 2010

Related U.S. Application Data

(60) Provisional application No. 61/109,427, filed on Oct. 29, 2008.

(51) Int. Cl.

| | |
|---|---|
| *G05B 15/00* | (2006.01) |
| *B23K 31/02* | (2006.01) |
| *B23K 9/16* | (2006.01) |
| *B23K 37/02* | (2006.01) |
| *B23K 37/04* | (2006.01) |
| *B25J 9/16* | (2006.01) |

(52) U.S. Cl.
CPC ............. *B23K 31/025* (2013.01); *B23K 9/16* (2013.01); *B23K 37/02* (2013.01); *B23K 37/0452* (2013.01); *B25J 9/1694* (2013.01); *B23K 2201/20* (2013.01); *G05B 2219/40032* (2013.01); *G05B 2219/45104* (2013.01); *Y10S 901/42* (2013.01)
USPC ............................................. 700/259; 901/42

(58) Field of Classification Search
CPC .... B23K 2201/20; B23K 31/025; B23K 9/16; B23K 37/02; B23K 37/0452; B25J 9/1694; G05B 2219/40032
USPC ................... 700/212, 259; 901/2, 42, 47
See application file for complete search history.

(56) References Cited

U.S. PATENT DOCUMENTS

| | | | |
|---|---|---|---|
| 930,759 A | 8/1909 | Hughes | |
| 1,874,066 A | 8/1932 | Scott et al. | |
| 1,879,127 A | 9/1932 | Schlumpf | |
| 1,932,487 A | 10/1933 | Scott | |
| 2,030,722 A | 2/1936 | Scott | |
| 2,198,849 A | 4/1940 | Waxler | |
| 2,297,157 A | 9/1942 | McClinton | |
| 2,719,026 A | 9/1955 | Boice | |

(Continued)

FOREIGN PATENT DOCUMENTS

| | | |
|---|---|---|
| CA | 2458158 C | 2/2004 |
| EP | 0049899 A1 | 4/1982 |

(Continued)

OTHER PUBLICATIONS

Kimura et al.; "Welding robot system for gas pipe, water pipe, comprises specific information processor for setting up welding program from several programs stored in memory unit based on information of objects to be welded"; Aug. 21, 2001; Derwent; AccNo. 2001-600344; pp. 1-2.*

(Continued)

*Primary Examiner* — Sean Shechtman
*Assistant Examiner* — Chad Rapp
(74) *Attorney, Agent, or Firm* — TraskBritt

(57) ABSTRACT

A system and method for the welding of drill bits using an automated robot or robots.

28 Claims, 13 Drawing Sheets

(56) References Cited

U.S. PATENT DOCUMENTS

| | | | |
|---|---|---|---|
| 3,010,708 A | 11/1961 | Lundquist | |
| 3,055,443 A | 9/1962 | Edwards | |
| 3,174,564 A | 3/1965 | Morlan | |
| 3,269,469 A | 8/1966 | Kelly, Jr. | |
| 3,424,258 A | 1/1969 | Nakyama | |
| 3,777,115 A | 12/1973 | Kazlauskas | |
| 3,865,525 A | 2/1975 | Dunn | |
| RE28,625 E | 11/1975 | Cunningham | |
| 4,006,788 A | 2/1977 | Garner | |
| 4,104,505 A | 8/1978 | Rayment | |
| 4,140,189 A | 2/1979 | Garner | |
| 4,162,389 A | 7/1979 | Shimdada et al. | |
| 4,182,394 A | 1/1980 | Cason, Jr. | |
| 4,190,126 A | 2/1980 | Kabashima | |
| 4,228,339 A | 10/1980 | Scales et al. | |
| 4,270,812 A | 6/1981 | Thomas | |
| 4,285,409 A | 8/1981 | Allen | |
| 4,293,048 A | 10/1981 | Kloesel | |
| 4,309,587 A | 1/1982 | Nakano et al. | |
| 4,320,808 A | 3/1982 | Garrett | |
| 4,343,371 A | 8/1982 | Baker et al. | |
| 4,358,471 A | 11/1982 | Derkacs et al. | |
| 4,359,112 A | 11/1982 | Garner et al. | |
| 4,369,849 A | 1/1983 | Parrish | |
| 4,373,128 A | 2/1983 | Asai et al. | |
| 4,396,077 A | 8/1983 | Radtke | |
| 4,410,284 A | 10/1983 | Herrick | |
| 4,411,935 A | 10/1983 | Anderson | |
| 4,444,281 A | 4/1984 | Schumacher et al. | |
| 4,527,637 A | 7/1985 | Bodine et al. | |
| 4,546,902 A | 10/1985 | Anderson | |
| 4,567,343 A | 1/1986 | Sullivan et al. | |
| 4,572,306 A | 2/1986 | Dorosz | |
| 4,598,778 A * | 7/1986 | Highsmith | 175/371 |
| 4,664,705 A | 5/1987 | Horton et al. | |
| 4,689,463 A | 8/1987 | Shubert | |
| 4,690,228 A | 9/1987 | Voelz et al. | |
| 4,726,718 A | 2/1988 | Meskin et al. | |
| 4,727,942 A | 3/1988 | Galle et al. | |
| 4,738,322 A | 4/1988 | Hall et al. | |
| 4,763,736 A | 8/1988 | Varel, Sr. | |
| 4,765,205 A | 8/1988 | Higdon | |
| 4,814,234 A | 3/1989 | Bird | |
| 4,835,357 A | 5/1989 | Schalk et al. | |
| 4,836,307 A | 6/1989 | Keshavan et al. | |
| 4,864,094 A | 9/1989 | Saltzman et al. | |
| 4,866,241 A | 9/1989 | Doherty et al. | |
| 4,874,047 A | 10/1989 | Hixon | |
| 4,875,532 A | 10/1989 | Langford | |
| 4,892,159 A | 1/1990 | Holster | |
| 4,923,511 A | 5/1990 | Krizan et al. | |
| 4,932,484 A | 6/1990 | Warren et al. | |
| 4,936,398 A | 6/1990 | Auty | |
| 4,943,488 A | 7/1990 | Sung et al. | |
| 4,953,641 A | 9/1990 | Pessier et al. | |
| 4,984,643 A | 1/1991 | Isbell et al. | |
| 4,991,671 A | 2/1991 | Pearce et al. | |
| 5,010,225 A | 4/1991 | Carlin | |
| 5,016,718 A | 5/1991 | Tandberg | |
| 5,027,912 A | 7/1991 | Juergens | |
| 5,028,177 A | 7/1991 | Meskin et al. | |
| 5,030,276 A | 7/1991 | Sung et al. | |
| 5,038,640 A | 8/1991 | Sullivan et al. | |
| 5,049,164 A | 9/1991 | Horton et al. | |
| 5,116,568 A | 5/1992 | Sung et al. | |
| 5,145,017 A | 9/1992 | Holster et al. | |
| 5,152,194 A | 10/1992 | Keshavan et al. | |
| 5,176,212 A | 1/1993 | Tandberg | |
| 5,224,560 A | 7/1993 | Fernandez | |
| 5,226,977 A | 7/1993 | Kitaguchi et al. | |
| 5,233,150 A | 8/1993 | Schneebeli et al. | |
| 5,238,074 A | 8/1993 | Tibbitts et al. | |
| 5,254,923 A * | 10/1993 | Kanitani | 318/568.11 |
| 5,287,936 A | 2/1994 | Grimes et al. | |
| 5,289,889 A | 3/1994 | Gearhart et al. | |
| 5,293,026 A | 3/1994 | Dennis et al. | |
| 5,314,722 A | 5/1994 | Kobayashi | |
| 5,337,843 A | 8/1994 | Torgrimsen et al. | |
| 5,346,026 A | 9/1994 | Pessier et al. | |
| 5,429,200 A | 7/1995 | Blackman et al. | |
| 5,439,068 A | 8/1995 | Huffstutler et al. | |
| 5,452,771 A | 9/1995 | Blackman et al. | |
| 5,467,836 A | 11/1995 | Grimes et al. | |
| 5,513,715 A | 5/1996 | Dysart | |
| 5,518,077 A | 5/1996 | Blackman et al. | |
| 5,524,510 A | 6/1996 | Davies et al. | |
| 5,535,838 A | 7/1996 | Keshavan et al. | |
| 5,547,033 A | 8/1996 | Campos, Jr. | |
| 5,553,681 A | 9/1996 | Huffstutler et al. | |
| 5,558,170 A | 9/1996 | Thigpen et al. | |
| 5,570,750 A | 11/1996 | Williams | |
| 5,593,231 A | 1/1997 | Ippolito | |
| 5,606,895 A | 3/1997 | Huffstutler | |
| 5,624,002 A | 4/1997 | Huffstutler | |
| 5,624,588 A * | 4/1997 | Terawaki et al. | 219/124.34 |
| 5,641,029 A | 6/1997 | Beaton et al. | |
| 5,644,956 A | 7/1997 | Blackman et al. | |
| 5,645,896 A | 7/1997 | Mills | |
| 5,655,612 A | 8/1997 | Grimes et al. | |
| D384,084 S | 9/1997 | Huffstutler et al. | |
| 5,695,018 A | 12/1997 | Pessier et al. | |
| 5,695,019 A | 12/1997 | Shamburger, Jr. | |
| 5,710,405 A | 1/1998 | Solomon et al. | |
| 5,740,872 A | 4/1998 | Smith | |
| 5,755,297 A | 5/1998 | Young et al. | |
| 5,755,298 A | 5/1998 | Langford, Jr. et al. | |
| 5,755,299 A | 5/1998 | Langford, Jr. et al. | |
| 5,853,815 A | 12/1998 | Muehlberger | |
| 5,866,872 A | 2/1999 | Lu et al. | |
| 5,868,502 A | 2/1999 | Cariveau et al. | |
| 5,873,422 A | 2/1999 | Hansen et al. | |
| 5,893,204 A | 4/1999 | Symonds | |
| 5,900,272 A | 5/1999 | Goodman | |
| 5,921,330 A | 7/1999 | Sue et al. | |
| 5,935,350 A | 8/1999 | Raghu et al. | |
| 5,941,322 A | 8/1999 | Stephenson et al. | |
| 5,942,289 A | 8/1999 | Jackson | |
| 5,944,125 A | 8/1999 | Byrd | |
| 5,967,246 A | 10/1999 | Caraway et al. | |
| 5,979,576 A | 11/1999 | Hansen et al. | |
| 5,988,303 A | 11/1999 | Arfele | |
| 5,992,542 A | 11/1999 | Rives | |
| 5,996,713 A | 12/1999 | Pessier et al. | |
| 6,023,044 A * | 2/2000 | Kosaka et al. | 219/124.34 |
| 6,046,431 A | 4/2000 | Beattie | |
| 6,084,196 A | 7/2000 | Flowers et al. | |
| 6,092,613 A | 7/2000 | Caraway et al. | |
| 6,095,265 A | 8/2000 | Alsup | |
| 6,109,375 A | 8/2000 | Tso | |
| 6,124,564 A | 9/2000 | Sue et al. | |
| 6,138,779 A | 10/2000 | Boyce | |
| 6,173,797 B1 | 1/2001 | Dystra et al. | |
| 6,214,420 B1 | 4/2001 | Girardin et al. | |
| 6,220,374 B1 | 4/2001 | Crawford | |
| 6,260,635 B1 | 7/2001 | Crawford | |
| 6,279,671 B1 | 8/2001 | Panigrahi et al. | |
| 6,283,233 B1 | 9/2001 | Lamine et al. | |
| 6,296,069 B1 | 10/2001 | Lamine et al. | |
| RE37,450 E | 11/2001 | Deken et al. | |
| 6,360,831 B1 | 3/2002 | Akesson et al. | |
| 6,375,895 B1 | 4/2002 | Daemen | |
| 6,376,801 B1 | 4/2002 | Farrell et al. | |
| 6,380,512 B1 | 4/2002 | Emer | |
| 6,386,302 B1 | 5/2002 | Beaton | |
| 6,392,190 B1 | 5/2002 | Sue et al. | |
| 6,401,844 B1 | 6/2002 | Doster et al. | |
| 6,408,958 B1 | 6/2002 | Isbell et al. | |
| 6,415,687 B2 | 7/2002 | Saxman | |
| 6,439,326 B1 | 8/2002 | Huang et al. | |
| 6,446,739 B1 | 9/2002 | Richman et al. | |
| 6,450,270 B1 | 9/2002 | Saxton | |
| 6,474,424 B1 * | 11/2002 | Saxman | 175/371 |
| 6,510,906 B1 | 1/2003 | Richert et al. | |
| 6,510,909 B2 | 1/2003 | Portwood et al. | |

(56) References Cited

U.S. PATENT DOCUMENTS

| | | |
|---|---|---|
| 6,527,066 B1 | 3/2003 | Rives |
| 6,533,051 B1 | 3/2003 | Singh et al. |
| 6,544,308 B2 | 4/2003 | Griffin et al. |
| 6,562,462 B2 | 5/2003 | Griffin et al. |
| 6,568,490 B1 | 5/2003 | Tso et al. |
| 6,585,064 B2 | 7/2003 | Griffin et al. |
| 6,589,640 B2 | 7/2003 | Griffin et al. |
| 6,592,985 B2 | 7/2003 | Griffin et al. |
| 6,601,475 B2 | 8/2003 | Davies et al. |
| 6,601,661 B2 | 8/2003 | Baker et al. |
| 6,601,662 B2 | 8/2003 | Matthias et al. |
| 6,615,936 B1 | 9/2003 | Mourik et al. |
| 6,649,682 B1 | 11/2003 | Breton et al. |
| 6,684,967 B2 | 2/2004 | Mensa-Wilmot et al. |
| 6,698,098 B2 | 3/2004 | Griffo et al. |
| 6,729,418 B2 | 5/2004 | Slaughter, Jr. et al. |
| 6,739,214 B2 | 5/2004 | Griffin et al. |
| 6,742,607 B2 | 6/2004 | Beaton |
| 6,749,033 B2 | 6/2004 | Griffin et al. |
| 6,766,870 B2 | 7/2004 | Overstreet |
| 6,772,849 B2 | 8/2004 | Oldham et al. |
| 6,797,326 B2 | 9/2004 | Griffin et al. |
| 6,843,333 B2 | 1/2005 | Richert et al. |
| 6,861,098 B2 | 3/2005 | Griffin et al. |
| 6,861,137 B2 | 3/2005 | Griffin et al. |
| 6,861,612 B2 | 3/2005 | Bolton et al. |
| 6,878,447 B2 | 4/2005 | Griffin et al. |
| 6,883,623 B2 | 4/2005 | McCormick et al. |
| 6,927,390 B2 | 8/2005 | Mickael |
| 6,986,395 B2 | 1/2006 | Chen |
| 6,988,569 B2 | 1/2006 | Lockstedt et al. |
| 7,034,262 B2 | 4/2006 | Fischer et al. |
| 7,041,936 B2 | 5/2006 | Oberzaucher et al. |
| 7,049,540 B2 | 5/2006 | Sanders et al. |
| 7,096,978 B2 | 8/2006 | Dykstra et al. |
| 7,111,694 B2 | 9/2006 | Beaton |
| 7,137,460 B2 | 11/2006 | Slaughter, Jr. et al. |
| 7,152,702 B1 | 12/2006 | Bhome et al. |
| 7,210,377 B2 | 5/2007 | Griffo et al. |
| 7,234,550 B2 | 6/2007 | Azar et al. |
| 7,262,240 B1 | 8/2007 | Breton et al. |
| 7,350,568 B2 | 4/2008 | Mandal et al. |
| 7,350,601 B2 | 4/2008 | Belnap et al. |
| 7,360,612 B2 | 4/2008 | Chen et al. |
| 7,361,411 B2 | 4/2008 | Daemen et al. |
| 7,377,341 B2 | 5/2008 | Middlemiss et al. |
| 7,387,177 B2 | 6/2008 | Zahradnik et al. |
| 7,392,862 B2 | 7/2008 | Zahradnik et al. |
| 7,398,837 B2 | 7/2008 | Hall et al. |
| 7,416,036 B2 | 8/2008 | Forstner et al. |
| 7,435,478 B2 | 10/2008 | Keshavan |
| 7,462,003 B2 | 12/2008 | Middlemiss |
| 7,473,287 B2 | 1/2009 | Belnap et al. |
| 7,493,973 B2 | 2/2009 | Keshavan et al. |
| 7,517,589 B2 | 4/2009 | Eyre |
| 7,533,740 B2 | 5/2009 | Zhang et al. |
| 7,568,534 B2 | 8/2009 | Griffin et al. |
| 2002/0017402 A1 | 2/2002 | Bird |
| 2004/0108145 A1 | 6/2004 | Siracki |
| 2004/0173384 A1 | 9/2004 | Yong et al. |
| 2005/0077090 A1 | 4/2005 | Viswanadham et al. |
| 2005/0087370 A1 | 4/2005 | Ledgerwood |
| 2005/0178587 A1 | 8/2005 | Witman et al. |
| 2005/0183892 A1 | 8/2005 | Oldham et al. |
| 2005/0263328 A1 | 12/2005 | Middlemiss |
| 2005/0273301 A1 | 12/2005 | Huang |
| 2006/0032674 A1 | 2/2006 | Chen et al. |
| 2006/0032677 A1 | 2/2006 | Azar et al. |
| 2006/0162969 A1 | 7/2006 | Belnap et al. |
| 2006/0177689 A1 | 8/2006 | Muir et al. |
| 2006/0196699 A1 | 9/2006 | Estes et al. |
| 2006/0213693 A1* | 9/2006 | Zahradnik et al. ............ 175/374 |
| 2006/0254830 A1 | 11/2006 | Radtke |
| 2006/0266558 A1 | 11/2006 | Middlemiss et al. |
| 2006/0266559 A1 | 11/2006 | Keshavan et al. |
| 2006/0278442 A1 | 12/2006 | Kristensen |
| 2006/0283640 A1 | 12/2006 | Estes et al. |
| 2007/0000698 A1* | 1/2007 | Viswanadham ............... 175/371 |
| 2007/0029114 A1 | 2/2007 | Middlemiss |
| 2007/0032905 A1* | 2/2007 | Nagatsuka et al. ............ 700/245 |
| 2007/0062736 A1 | 3/2007 | Cariveau et al. |
| 2007/0079994 A1 | 4/2007 | Middlemiss |
| 2007/0187155 A1 | 8/2007 | Middlemiss |
| 2007/0243794 A1* | 10/2007 | Mundt .............................. 451/5 |
| 2008/0066970 A1 | 3/2008 | Zahradnik et al. |
| 2008/0145686 A1 | 6/2008 | Mirchandani et al. |
| 2008/0181366 A1 | 7/2008 | Bamola |
| 2008/0264695 A1 | 10/2008 | Zahradnik et al. |
| 2008/0296068 A1 | 12/2008 | Zahradnik et al. |
| 2009/0032310 A1* | 2/2009 | Stevens et al. ................. 175/435 |
| 2009/0039062 A1 | 2/2009 | Cretegny et al. |
| 2009/0114454 A1 | 5/2009 | Belnap et al. |
| 2009/0126998 A1 | 5/2009 | Zahradnik et al. |
| 2009/0159338 A1 | 6/2009 | Buske |
| 2009/0159341 A1 | 6/2009 | Pessier et al. |
| 2009/0166093 A1 | 7/2009 | Pessier et al. |
| 2009/0178855 A1 | 7/2009 | Zhang et al. |
| 2009/0183925 A1 | 7/2009 | Zhang et al. |
| 2010/0065337 A1 | 3/2010 | Luce et al. |
| 2010/0078224 A1* | 4/2010 | Steel et al. ..................... 175/369 |
| 2010/0104736 A1 | 4/2010 | Luce et al. |
| 2010/0159157 A1 | 6/2010 | Stevens et al. |
| 2010/0181292 A1 | 7/2010 | Stauffer et al. |

FOREIGN PATENT DOCUMENTS

| | | | |
|---|---|---|---|
| EP | 0194050 | A1 | 9/1986 |
| EP | 0225101 | | 6/1987 |
| EP | 0157278 | | 11/1989 |
| EP | 0351039 | A2 | 1/1990 |
| EP | 0496181 | A1 | 7/1992 |
| EP | 0496181 | B1 | 7/1992 |
| EP | 0573135 | A1 | 12/1993 |
| EP | 0391683 | | 1/1996 |
| EP | 2089187 | A1 | 8/2009 |
| GB | 1323672 | A * | 7/1973 |
| GB | 2183694 | A | 6/1987 |
| GB | 2276886 | A | 10/1994 |
| GB | 2293615 | A | 4/1996 |
| GB | 2295157 | A | 5/1996 |
| GB | 2311085 | A | 9/1997 |
| JP | 05131289 | A | 5/1993 |
| JP | 08141744 | A | 6/1996 |
| JP | 2005524533 | A | 8/2005 |
| WO | 8502223 | A1 | 5/1985 |
| WO | 9706339 | A1 | 2/1997 |
| WO | 2008124572 | A1 | 10/2008 |
| WO | WO2009/043369 | * | 4/2009 |

OTHER PUBLICATIONS

International Search Report for International Application No. PCT/US2009/061632 mailed May 10, 2010, 3 pages.

International Written Opinion for International Application No. PCT/US2009/061632 mailed May 10, 2010, 3 pages.

Berge, James M., "Automating the Welding Process, Successful Implementation of Automated Welding Systems," Copyright 1994 by Industrial Press Inc., New York, NY.

Cary, Howard B., "Arc Welding Automation," Copyright 1995 by Marcel Dekker, Inc., New York, NY, Chapters 1-20 and Appendixes. (submitted in six parts).

"EZCase Casing Bit System," © 2007 Baker Hughes Incorporated, www.HCCbits.com, 2 pages.

"EZReam Casing/Liner Shoe," © 2007 Baker Hughes Incorporated, www.HCCbits.com, 2 pages.

"GaugePro XPR Expandable Reamer," © 2008 Baker Hughes Incorporated, www.HCCbits.com, 2 pages.

Creating E&P Value, inDepth TM, vol. 10, No. 1, 2004, © 2004 Baker Hughes Incorporated, pp. 6-60.

Ream-While-Drilling Technology Operations Manual (RWD2), © 2007 Baker Hughes Incorporated, pp. 6-148. Reann While-Drilling Technology Operations Manual (RWD2), © 2007 Baker Hughes Incorporated, pp. 6-148.

(56) References Cited

OTHER PUBLICATIONS

Buske et al., Performance Pardigm Shift: Drilling Vertical and directional Sections Through Abrasive Formations with Roller Cone Bits, Society of Petroleum Engineers—ISPE 114975, CIPC/SPE Gas Technology Symposium 2008 Joint Conference, Canada, Jun. 16-19, 2008.

Ersoy et al., Wear Charateristics of PDC Pin and Hybrid Core Bits in Rock Drilling, Wear 188, Elesevier Science S. A., Mar. 1995, pp. 150-165.

Gatto et al., Plasma Transferred Arc Deposition of Powdered High Performances Alloys: Process Parameters Optimization as a Function of Alloy and Geometrical Configuration, Surface & Coatings Technology, vol. 187 (2-3), pp. 265-271 (2004).

George et al., Significant Cost Savings Achieved Through the Use of PDC Bits in Compressed Air/Foam Applications, Society of Petroleum Engineers—SPE 116118, 2008 SPE Annual Technical Conference and Exhibition, Denver, Colorado, Sep. 21-24, 2008.

Mills Machine Company, Inc., Rotary Hole Openers—Section 8, http://www.millsmachine.com/pages/home_page/mills_catalog/cat_holeopen/cat_holeopen.pdf, retrieved Apr. 27, 2009.

Pessier et al., Hybrid Bits Offer Distinct Advantages in Selected Roller Cone and PDC Bit Applications, IADC/SPE Drilling Conference and Exhibition, Feb. 2-4, 2010, New Orleans.

Sheppard et al., Rock Drilling—Hybrid Bit Success for Syndax3 Pins, Industrial Diamond Review, Jun. 1993, pp. 309-311.

Smith Services, Hole Opener—Model 6980 Hole Opener, http://www.siismithservices.com/b_products/product_page.asp?ID=589, retrieved May 7, 2008.

Tomlinson et al., Rock Drilling—Syndax3 Pins-New Concepts in PCD Drilling, Industrial Diamond Review, Mar. 1992, pp. 109-114.

Warren et al., PDC Bits, What's Needed to Meet Tomorrow's Challenge, SPE 27978, University of Tulsa Centennial Petroleum Engineering Symposium, Aug. 1994, pp. 207-214.

Wells et al., Bit Balling Mitigation in PDC Bit Design, International Association of Drilling Contractors/Society of Petroleum Engineers—IADC/SPE 114673, IADC/SPE Asia Pacific Drilling Technology Conference and Exhibition, Indonesia, Aug. 25-27, 2008.

Williams et al., An Analysis of the Performance of PDC Hybrid Drill Bits, SPE/IADC 16117, SPE/IADC Drilling Conference, Mar. 1987, pp. 585-594.

* cited by examiner

SYSTEMS AND METHODS FOR ROBOTIC WELDING OF DRILL BITS

PRIORITY CLAIM

This application claims the benefit of the filing date of U.S. patent application Ser. No. 61/109,427, filed Oct. 29, 2008, for "METHOD AND APPARATUS FOR ROBOTIC WELDING OF DRILL BITS." This application is also related to U.S. patent application Ser. No. 12/257,219, filed Oct. 23, 2008, now U.S. Pat. No. 8,450,637, issued May 28, 2013, for "APPARATUS FOR AUTOMATED APPLICATION OF HARDFACING MATERIAL TO DRILL BITS"; U.S. patent application Ser. No. 12/341,595, filed Dec. 22, 2008, for "ROBOTICALLY APPLIED HARDFACING WITH PREHEAT; U.S. patent application Ser. No. 12/562,797, filed Sep. 18, 2009, now U.S. Pat. No. 8,698,038, issued Apr. 15, 2014, for "METHOD AND APPARATUS FOR THE AUTOMATED APPLICATION OF HARDFACING MATERIAL TO ROLLING CUTTERS OF EARTH-BORING DRILL BITS"; and to U.S. patent application Ser. No. 12/651,113, filed Dec. 31, 2009, for "METHOD AND APPARATUS FOR AUTOMATED APPLICATION OF HARDFACING MATERIAL TO ROLLING CUTTERS OF HYBRID-TYPE EARTH BORING DRILL BITS, HYBRID DRILL BITS COMPRISING SUCH HARDFACED STEEL-TOOTHED CUTTING ELEMENTS, AND METHODS OF USE THEREOF."

BACKGROUND OF THE INVENTION

1. Field of the Invention

The present invention relates to a system and method for the welding of drill bits using robotic apparatus.

2. State of the Art

In the exploration of oil, gas, and geothermal energy, wells or boreholes in the earth are created in drilling operations using various types of drill bits. These operations typically employ rotary and percussion drilling techniques. In rotary drilling, the borehole is created by rotating a drill string having a drill bit secured to its lower end. As the drill bit drills the well bore, segments of drill pipe are added to the top of the drill string. While drilling, a drilling fluid is continually pumped into the drilling string from surface pumping equipment. The drilling fluid is transported through the center of the hollow drill string and through the drill bit. The drilling fluid exits the drill bit through one or more nozzles in the drill bit. The drilling fluid then returns to the surface by traveling up the annular space between the well bore and the outside of the drill string. The drilling fluid transports cuttings out of the well bore as well as cooling and lubricating the drill bit.

The type of drill bit used to drill the well will depend largely on the hardness of the formation being drilled. One type of rotary rock drill is a drag bit. Early designs for a drag bit included hard facing applied to various portions of the bit. Currently, designs for drag bits have extremely hard cutting elements, such as natural or synthetic diamonds, mounted to a bit body. As the drag bit is rotated, the cutting elements form the bottom and sides of the well bore Another typical type of rotary drill bit is the tri-cone roller drill bit that has roller cones mounted on the body of the drill bit, which rotate as the drill bit is rotated. Cutting elements, or teeth, protrude from the roller cones. The angles at which the roller cones are mounted on the bit body determine the amount of cut or bite of the bit with respect to the well bore. As the roller cones of the drill bit roll on the bottom of the hole being drilled, the teeth or carbide inserts apply a high compressive and shear loading to the formation causing fracturing of the formation into debris. The cutting action of roller cones comprises a combination of crushing, chipping and scraping. The cuttings from a roller cone drill bit typically comprise a mixture of chips and fine particles.

There are two general types of roller cone drill bits; TCI bits and milled-tooth bits. "TCI" is an abbreviation for Tungsten Carbide Insert. TCI roller cone drill bits have roller cones having a plurality of tungsten carbide or similar inserts of high hardness that protrude from the surface of the roller cone. Numerous styles of TCI drill bits are designed for various types of formations, in which the shape, number and protrusion of the tungsten carbide inserts on the roller cones of the drill bit will vary, along with roller cone angles on the drill bit.

Milled-tooth roller cone drill bits are also referred to as milled-tooth bits because the steel teeth of the roller cones are formed by a milling machine. However, in larger bits, it is also known to cast the steel teeth and, therefore, "milled-tooth" is the better reference. A milled-tooth roller cone drill bit uses roller cones each having an integral body of hardened steel with teeth formed on the periphery. There are numerous styles of milled-tooth roller cone drill bits designed for formations of varying hardness in which the shape, number and protrusion of the teeth will vary, along with roller cone angles on the drill bit.

Conventional welding techniques used to attach a circular plug to the leg of a milled-tooth or TCI roller cone drill bits that may include arc welding, oxyacetylene welding (OAW) and atomic hydrogen welding (AHW). Currently, manual welding is typically used in the commercial production of roller cone rock bits. Bit legs having roller cones are mounted on a positioning table while a welding torch and welding rod are used to manually weld the plug to the bit leg while either the bit leg or the welder moves from various positions to complete the welding of the plug on the bit leg. The welding process for attaching the plug to a bit leg is difficult due to the circular weld to be made attaching the plug to the bit leg.

Typically, the skill of the individual applying hardfacing determines the quality of the weld. The quality of weld between drill bits varies. Limited availability of qualified welders has aggravated the problem because the welding of the plug to the bit leg is extremely tedious, repetitive, skill-dependent, time-consuming, and expensive.

U.S. Pat. No. 6,392,190 provides a description of the use of a robotic arm in the hardfacing of roller cones, in which the torch is held by a robotic arm and the roller cones are moved on a positioning table. A manual welder is replaced with a robotic arm for holding the torch. The robotic arm and a positioning table are combined to have more than five movable axes in the system for applying hardfacing.

Therefore, there is a need to develop a system and method for welding plugs to bit arms of drill bit consistent with the material and application quality standards obtainable by manual welding.

BRIEF SUMMARY OF THE INVENTION

A system and method for the welding of drill bits using an automated robot or robots.

BRIEF DESCRIPTION OF THE SEVERAL VIEWS OF THE DRAWINGS

The objects and features of the invention will become more readily understood from the following detailed description and appended claims when read in conjunction with the accompanying drawings in which like numerals represent like elements.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE INVENTION

Figure 1:
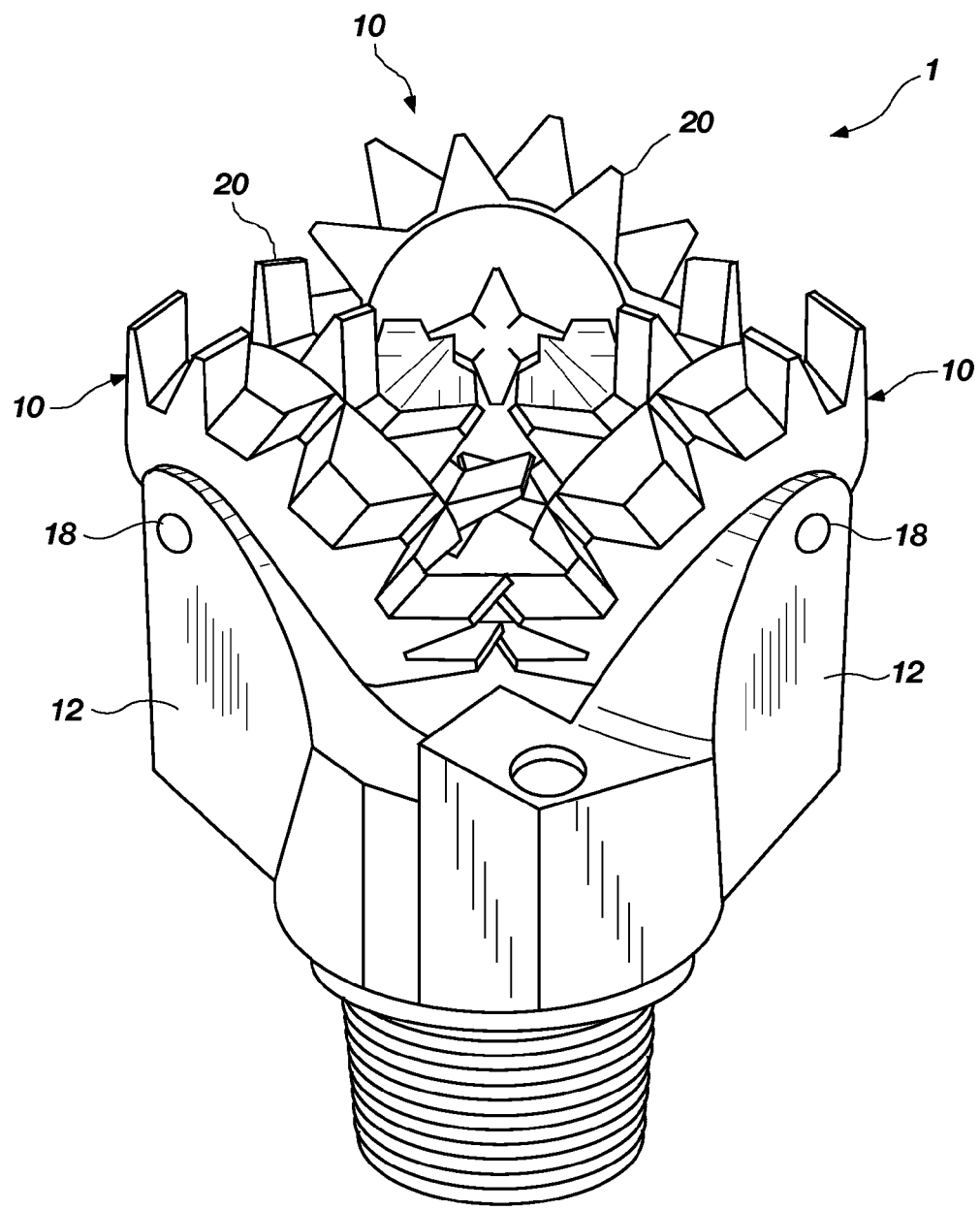
FIG. 1 is a side view of a roller cone drill bit having milled teeth.

The systems and methods of the present invention relate to automatic welding of a plug, a first member, in a bit leg, a second member, such as a ball plug for sealing a hole in a bit leg through which ball bearings may be introduced to an interface between a roller cone and a bearing pin on which the roller cone is rotatably mounted. In embodiments of the systems and methods of the present invention, a robotic system may be used to manipulate a welding torch, such as an arc welding torch, an oxyacetylene welding (OAW) torch, an atomic hydrogen welding (AHW) torch, or a plasma transfer arc (PTA) welding torch, all of which are collectively referred to herein as a "torch." The robotic system may comprise a multi-axis robotic arm (e.g., a five-axis or a six-axis robotic arm). The robotic arm may be program-controllable for movement relative to the multiple axis in three-dimensional space. Power, shielding, plasma, and transport gases may be supplied to the torch through electrically controllable flow valves.

In some embodiments, a bit body or bit leg may be mounted on a fixture on a workpiece holder or positioner, such as a rotatable platen. The rotatable platen may have a plurality of stations mounted circumferentially around an upper rotatable surface of the platen, such that a plurality of bit bodies or bit legs may be mounted on the rotatable surface of the platen.

In some embodiments, another robot having program controllable movement of an articulated arm may be used. A chuck adapter may be attached to the arm of the robot, and any desired style chuck may be attached to the chuck adapter. The chuck is capable of securely holding a bit leg in any desired position to weld the plug to the bit leg.

Embodiments of welding systems of the present invention may comprise a first sensor that is positioned, oriented, and configured for determining a location or position of a portion of a bit body or bit leg (e.g., a ball plug) in at least one dimension of three-dimensional space. The first position sensor may comprise, for example, a laser range finder. The first sensor may be used for determining a position of a ball plug in a bit body or bit leg relative to at least one dimension in three-dimensional space, such as, for example, the Z-direction (i.e., the vertical direction with respect to the orientation of the gravitational field). For example, a distance between a ball plug in a bit body or bit leg mounted over a surface of a rotatable platen and the surface of the platen may be determined using the first position sensor, or a distance between a ball plug in a bit body or bit leg and the sensor itself may be determined using the first position sensor. Information relating to the position of the ball plug relative to the at least one dimension in three-dimensional space (e.g., a distance between the ball plug and a reference point in three-dimensional space) may be sent electronically to a computer or controller of the welding system.

Embodiments of welding systems of the present invention also may comprise a second sensor for determining a position of the ball plug and/or a size of a ball plug in a bit body or a bit leg. For example, a camera may be used to take a picture or image of the ball plug in the bit body or bit leg, and a computer device may be configured under control of a computer program to electronically analyze the picture or image, identify a boundary of the ball plug in the picture or image, and to measure an average diameter of the ball plug using the picture or image. The computer device may further be configured under control of a computer program to determine a location of the center of the ball plug such as, for example, a location of the center of the ball plug in the XY plane (i.e., the plane oriented transverse to the Z-axis and the gravitational field). Information relating to the position of the center of the ball plug (e.g., a location of the center of the ball plug in the XY plane) and the size (e.g., average diameter) of the ball plug may be sent electronically to a computer or controller of the welding system.

After the position of the ball plug in three-dimensional space has been determined using at least one position sensor, and after a size of the ball plug has been determined using at least one sensor, the computer or controller of the welding system may be used to identify and select an appropriate welding program from a predefined set of welding programs (each of which may be configured for use in welding different sizes of ball plugs, such as different sized ball plugs used in different sized bit bodies or bit legs). The selected welding program then may be used to control movement of the robot and the torch attached thereto to weld an interface between a ball plug and the surrounding surfaces of the bit body or bit leg. In additional embodiments, the selected welding program may be used to control movement of the robot and the torch attached thereto to build up a ball plug in the access hole for the ball bearings at least substantially entirely from filler material deposited during the welding process. In other words, a prefabricated ball plug may not be positioned in the hole and welded to the bit body or bit leg, but rather the ball plug may be at least substantially entirely formed during the welding process in some embodiments of the invention.

In some embodiments of the present invention, the welding torch may be caused to perform a single rotational welding pass circumferentially three hundred and sixty degrees around the ball plug, to allow the ball plug to cool, and then to later perform one or more additional rotational welding passes circumferentially three hundred and sixty degrees around the ball plug to complete the welding process. For example, a pre-fabricated ball plug may be recessed within the ball access hole prior to welding. The welding process may be used to weld the pre-fabricated ball plug to the surrounding surfaces of the bit body or bit leg, and filler material deposited during the welding process may be deposited within the recess to at least substantially fill the recess until it is at least generally flush with the outer surface of the bit body or bit leg.

In some embodiments of the present invention, the welding torch may comprise a metal inert gas (MIG) welding torch having a consumable electrode. In other embodiments, the welding torch may comprise a tungsten inert gas (TIG) welding torch having a non-consumable electrode. In yet additional embodiments, the welding torch may comprise a plasma transferred arc (PTA) welding torch.

As previously discussed, filler material may be deposited in some embodiments of the present invention. The filler material may comprise a metal material such as, for example, an INCONEL® metal alloy (e.g., a nickel-based metal alloy containing approximately 60% nickel by weight, and further including chromium, molybdenum, and niobium). In additional embodiments, the filler material may comprise any one of an iron-based alloy (e.g., a steel alloy), a cobalt-based alloy, or a nickel-based alloy.

In additional embodiments of the present invention, either the bit leg or the torch may be moved independently or simultaneously during welding of the plug to the bit leg.

An advantage of the system and method of the present invention is that it automates the welding of the ball plug to the bit leg, which increases the consistency and quality of the welding, and thus the reliability, performance, and cost efficiency bit leg used to form a drill bit. Another advantage of the system and method of present invention is that it reduces manufacturing cost and reliance on skilled laborers. Another advantage system and method of the present invention is that by decreasing production time, product inventory levels can be reduced. Another advantage system and method of the present invention is that it facilitates the automated collection of welding data, from which further process controls and process design improvements can be made.

Another advantage of the system and method of the present invention is that utilization of the robotic arm to manipulate the bit leg improves the opportunity to integrate sensors for providing feedback.

As referred to hereinabove, the "system and method of the present invention" refers to one or more embodiments of the invention. The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1A:
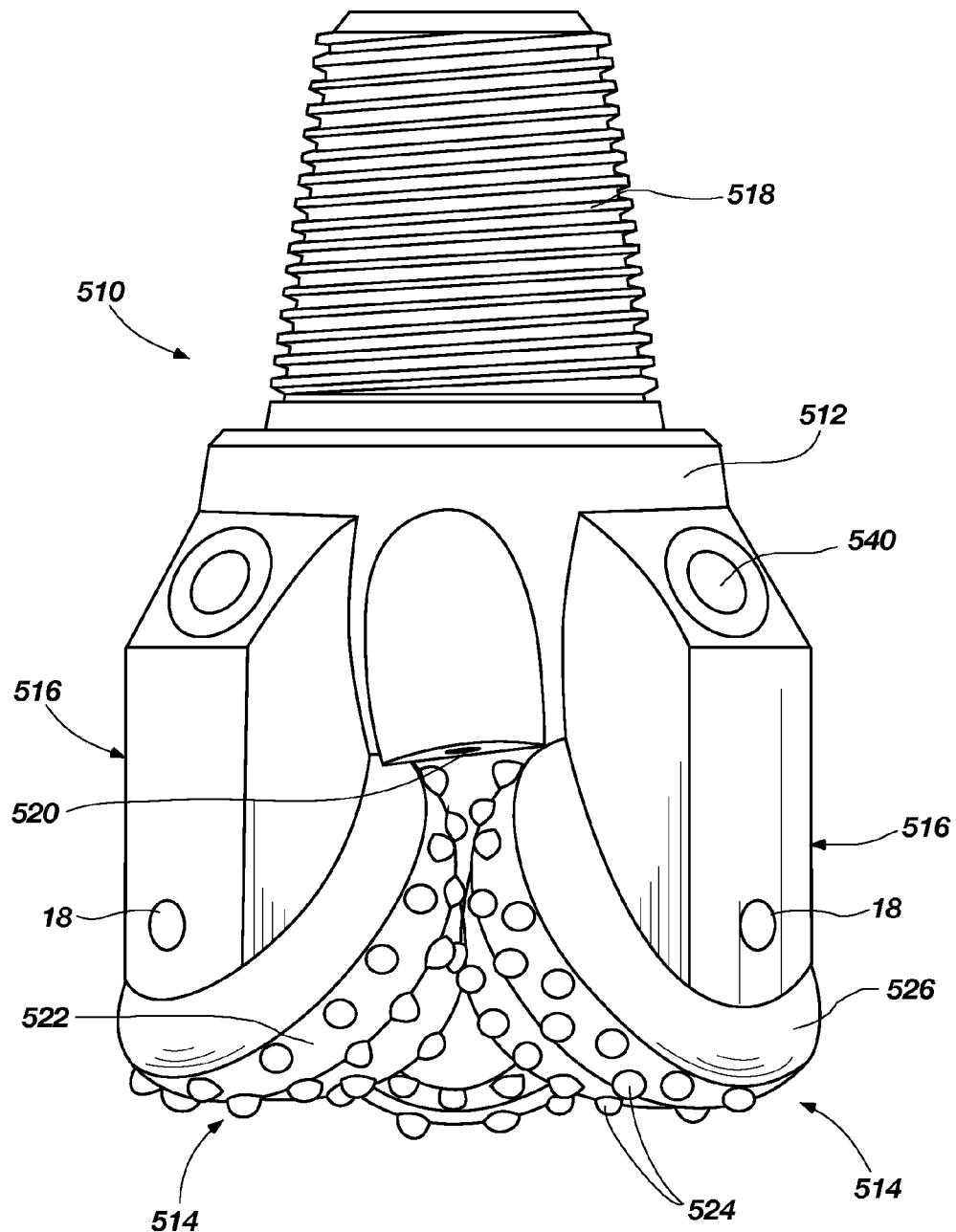
FIG. 1A is a side view of a roller cone drill bit having insert cutters.
Figure 1B:
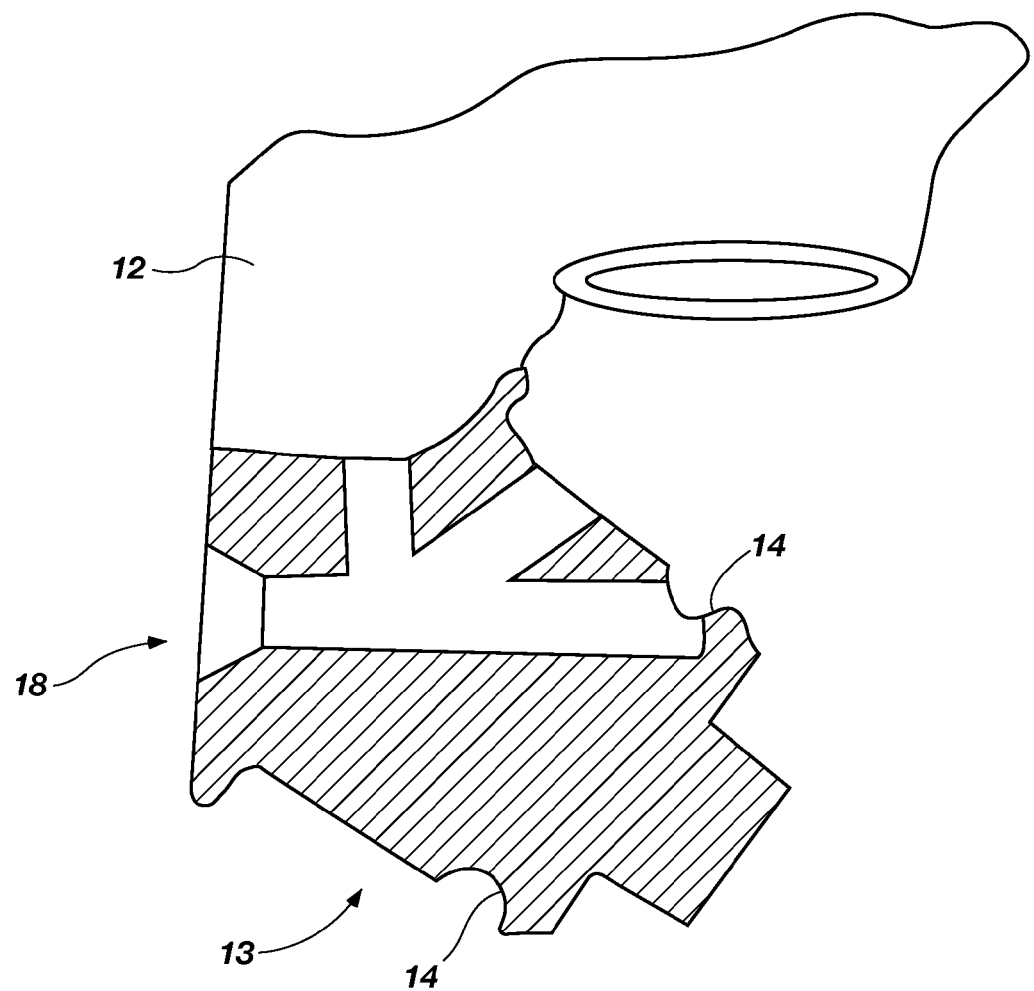
FIG. 1B is a partial cross-sectional view of a portion of a bit leg of a roller cone drill bit illustrating a bearing pin extending from the bit leg.
Figure 1C:
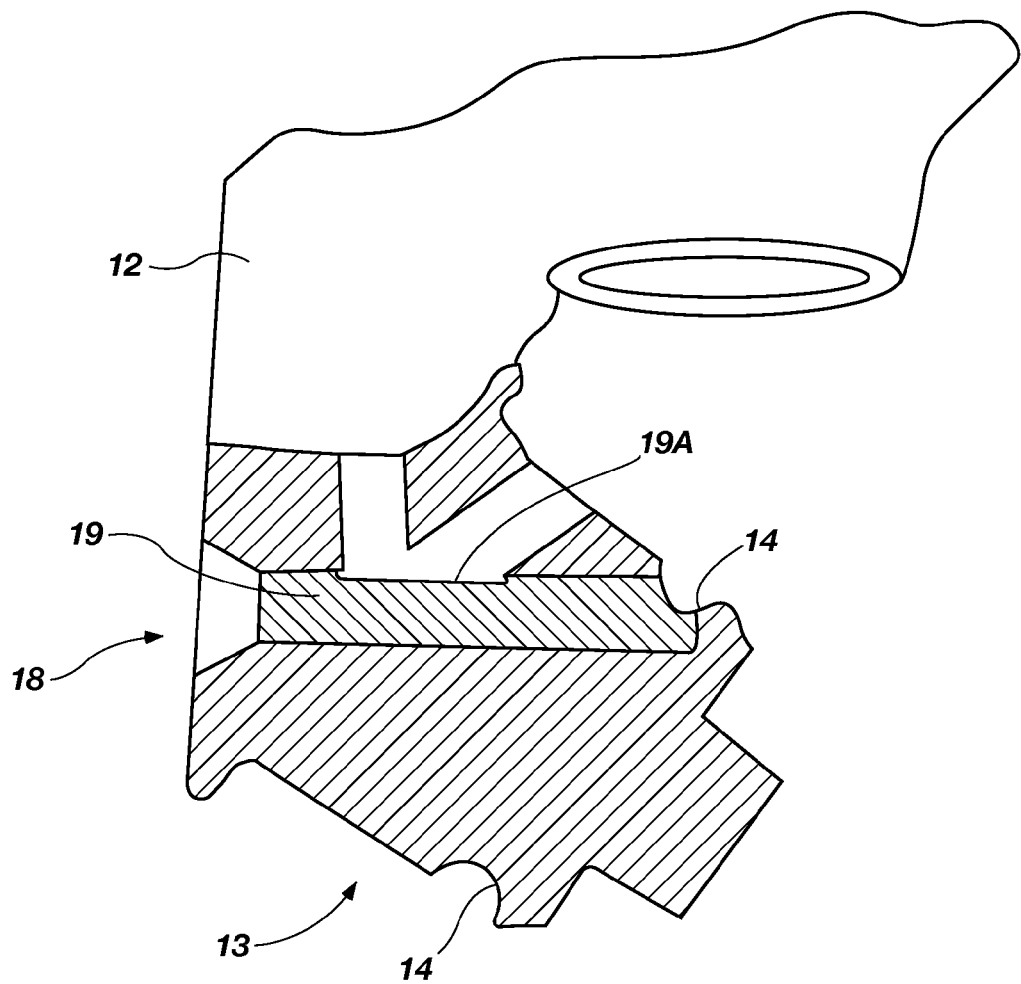
FIG. 1C is a partial cross-sectional view, like that of FIG. 1B illustrating a ball plug in a passageway for intruding ball bearings into a bearing race formed on a surface of the bearing pin.

FIG. 1 is a side view of a milled-tooth roller cone drill bit 1. The drill bit 1 has a plurality of roller cones 10 mounted on a plurality of bit legs 12, which are welded together to form the drill bit 1. Milled-tooth roller cone 10 has a plurality of rows of teeth 20. As known in the art, each of the roller cones 10 may be mounted on a bearing pin 13 (FIGS. 1B and 1C) depending from one of the bit legs 12. Bearing races 14 may be formed on mating surfaces of the roller cones 10 and the bearing pins 13, as shown in FIGS. 1B and 1C. The roller cone 10 is not shown in FIGS. 1B and 1C, although an bearing race like the bearing race 14 may be formed on an interior surface of the roller cone 10 such that, when the roller cone 10 is mounted on the bearing pin 13, the bearing race of the roller cone 10 is aligned with the bearing race 14 of the bearing pin, the bearing races together defining a composite bearing race having a toroidal shape. After positioning the roller cones 10 on the bearing pins 13, ball bearings (not shown) may be introduced into the mating bearing races 14 through a hole or passageway 18 extending through the bit leg 12 to the bearing races, as known in the art. Referring to FIG. 1C, after introducing the ball bearings into the bearing races 14 through the hole or passageway 18, the hole or passageway 18 may be closed with a ball plug 19 in accordance with embodiments of the welding systems and methods of the present invention, as disclosed herein. In some embodiments, the ball plug 19 may comprise a groove or recess 19A for forming part of a channel of a fluid pressure compensation system of the bit leg 12.

Embodiments of the present invention relate not only to roller cone drill bits having milled-teeth, such as the roller cone drill bit 1 shown in FIG. 1, but also to any other type of roller cone drill bit. FIG. 1A is a side elevational view of an earth-boring roller cone drill bit 510 according to another embodiment of the present invention that includes insert cutters 524. The earth-boring drill bit 510 includes a bit body 512 and a plurality of rotatable cutter assemblies 514. The bit body 512 may include a plurality of integrally formed bit legs 516 having plugs 540, and threads 518 may be formed on the upper end of the bit body 512 for connection to a drill string (not shown). The bit body 512 may have nozzles 520 for discharging drilling fluid into a borehole, which may be returned along with cuttings up to the surface during a drilling operation. Each of the rotatable cutter assemblies 514 includes a cone 522 comprising a particle-matrix composite material (e.g., cobalt cemented tungsten carbide). The insert cutters 524 may be inserted into recesses or pockets formed in a surface of the cones 522. Each cone 522 may include a conical gage surface 526. Additionally, each cone 522 may have a unique configuration of insert cutters 524 or cutting elements, such that the cones 522 may rotate in close proximity to one another without mechanical interference.

The bit legs 516 also include a ball plug 19 in a hole or passageway 18, as previously described with reference to the drill bit 1. As the bit legs 516 are highly stressed during the drilling of wells using drill bit 510, the manner in which any ball plug 19 is attached to a bit leg 516 is significant as the ball plug 19 must remain on or in the bit leg 516. Further, the attachment of a ball plug 19 should not weaken the bit leg 516.

Figure 2:
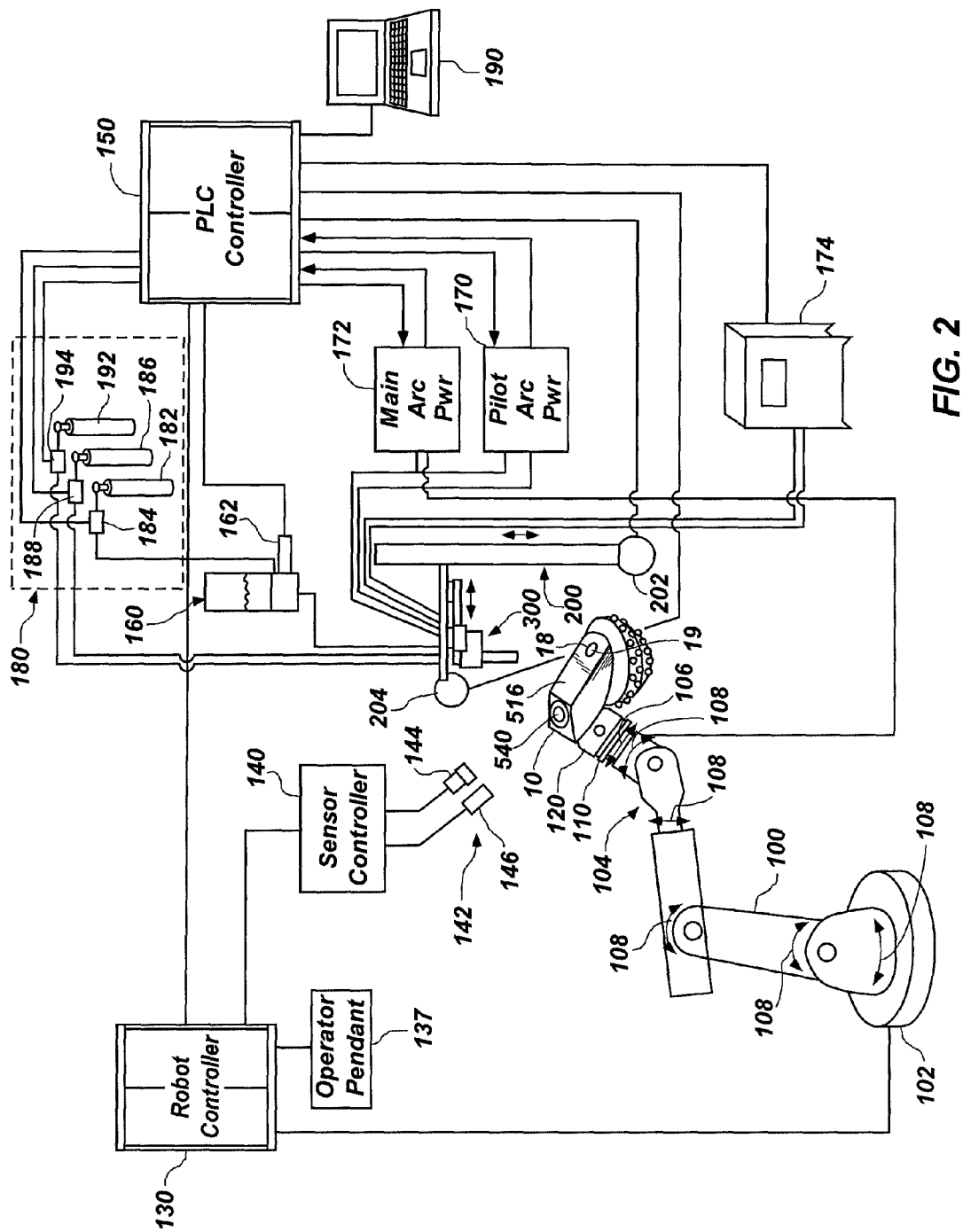
FIG. 2 is a schematic of an embodiment of a robotic welding system of the present invention for welding a plug in a hole of a bit body of a drill bit such as those shown in FIGS. 1 and 1A.
Figure 2A:
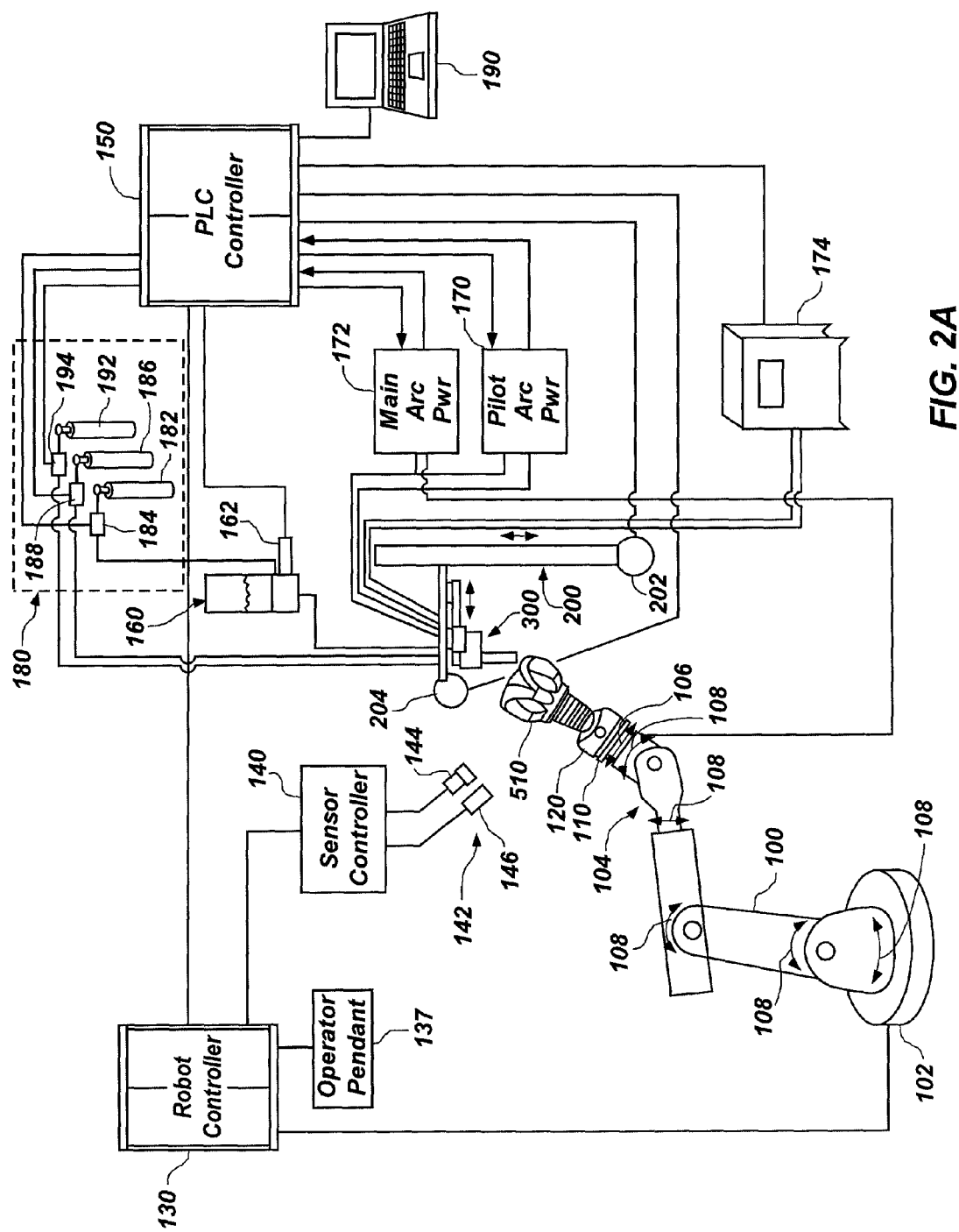
FIG. 2A is a schematic of another embodiment of the robotic welding system of the present invention for a drag type drill bit.

FIGS. 2 and 2A are schematic illustrations of example embodiments of systems of the present invention. Seen in FIG. 2 is an industrial robot 100 having a stationary base 102 and an articulated arm 104. Articulated arm 104 has a distal end 106. Robot 100 has a plurality of axes of rotation 108 about which controllable movement permits wide-range positioning of distal end 106 relative to base 102. Robot 100 has six or more independently controllable axes of movement between base 102 and the distal end 106 of arm 104. FIG. 2A illustrates a drill bit 510 attached to the articulated arm 104, although drill bit 1 or any portion or portions of any drill bit (such as a bit leg 12) may be attached to articulated arm 104 for the welding of a ball plug 19 to the bit body of a drill bit.

Robot 100 may have a handling capacity of 125 kg or more, and articulated arm 104 may have a wrist torque rating of 750 Nm or more. Robot 100 has six independently controllable axes of movement between base 102 and distal end 106 of arm 104. Examples of such industrial robots that are commercially available include models IRB 6600/IRB 6500, which are available from ABB Robotics, Inc., 125 Brown Road, Auburn Hills, MI, USA, 48326-1507.

An adapter 110 is attached to distal end 106. Adapter 110 has a ground connector 112 for attachment to an electrical ground cable (not shown). A chuck 120 is attached to adapter 110. Chuck 120 securely grips the bit leg 516, drill bit 510, bit leg 12, or drill bit 1.

A heat sink, or thermal barrier, may be provided between adapter 110 and bit leg 516, bit leg 12, drill bit 1, or drill bit 510 to prevent heat from causing premature failure of the rotating axis at distal end 106 of articulated arm 104. The thermal barrier is an insulating spacer (not shown) located between bit leg 516 or drill bit 510 and distal end 106 of robot 100. Alternately, bit leg 516, bit leg 12, drill bit 1, or drill bit 510 may be gripped in a manner that provides an air space between the distal end 106 of robot 100 and the bit leg 516, bit leg 12, drill bit 1, or drill bit 510 to dissipate heat.

A robot controller 130 is electrically connected to robot 100 for programmed manipulation of robot 100, including movement of articulated arm 104. An operator pendant 137 may be provided as electrically connected to robot controller 130 for convenient operator interface with robot 100. A sensor controller 140 is electrically connected to robot controller 130. Sensor controller 140 may also be electrically connected to a programmable logic controller 150.

A plurality of sensors 142 are electrically connected to sensor controller 140. Sensors 142 may include a camera 144 and/or a contact probe 146. Alternately, sensors 142 include a suitable laser proximity sensor 148. Other types of sensors 142 may also be used. Sensors 142 provide interactive information to robot controller 130, such as the distance between the torch 300 and the bit leg 516, drill bit 510, bit leg 12, or drill bit 1.

A programmable logic controller 150 is electrically connected to robot controller 130. Programmable logic controller (PLC) 150 provides instructions to auxiliary controllable devices that operate in coordinated and programmed sequence with robot 100.

A powder dosage system 160 may be provided for dispensing powder if a plasma transferred arc welding process is used to weld the ball plug 19 to the bit leg 516 or bit leg 12. A driver 162 is electrically connected to PLC 150 for dispensing the powder at a predetermined, desired rate.

A pilot arc power source 170 and a main arc power source 172 are electrically connected to PLC 150. A cooling unit 174 is electrically connected to PLC 150. A data-recording device 190 may be electrically connected to PLC 150.

A gas dispensing system 180 is provided. A transport gas source 182 supplies transport gas through a flow controller 184 to carry or transport welding powder, if plasma transferred arc welding is used, to torch 300. Flow controller 184 is electrically connected to PLC 150, which controls the operation of flow controller 184 and the flow and flow rate of the transport gas. A plasma gas source 186 supplies gas for plasma formation through a flow controller 188. Flow controller 188 is electrically connected to PLC 150, which controls the operation of flow controller 188 and the flow and flow rate of the plasma gas. Similarly, a shielding gas source 192 supplies shielding gas through a flow controller 194 for any welding process requiring a shielding gas. Flow controller 194 is electrically connected to PLC 150, which controls the operation of flow controller 194 and the flow and flow rate of the shielding gas. It is known to utilize a single gas source for more than one purpose, e.g., plasma, shielding, and transport. Thus, different, multiple flow controllers connected in series alignment can control the flow and flow rate of gas from a single gas source.

The torch 300 may comprise, for example, a metal inert gas (MIG) arc welding torch, a tungsten inert gas (TIG) arc welding torch, a plasma transferred arc (PTA) welding torch, an oxyacetylene welding (OAW) torch, or an atomic hydrogen welding (AHW) using a plasma transfer arc (PTA), all of which are collectively referred to herein as a "torch." A welding wire, welding rod, or welding powder may be supplied to the torch 300, and plasma, transport, and shielding gases may be supplied to the torch 300 as necessary or desirable from their respective supplies and controllers in gas dispensing system 180. Torch 300 may be secured to a positioner or positioning table 200, which grips and manipulates torch 300. In some embodiments, the positioner 200 may be capable of programmed positioning of torch 300 in three-dimensional space. A positioner 200 may include a vertical drive 202 and a horizontal drive 204. Drives 202 and 204 may be toothed belts, ball screws, a toothed rack, pneumatic, or other means. If additional embodiments, an industrial robot 100 having multiple (e.g., five or six) independently controllable axes of movement between base 102 and a welding tip of a torch 300 attached thereto as described herein may be used as the positioner 200 having the torch 300 mounted thereon.

Figure 3:
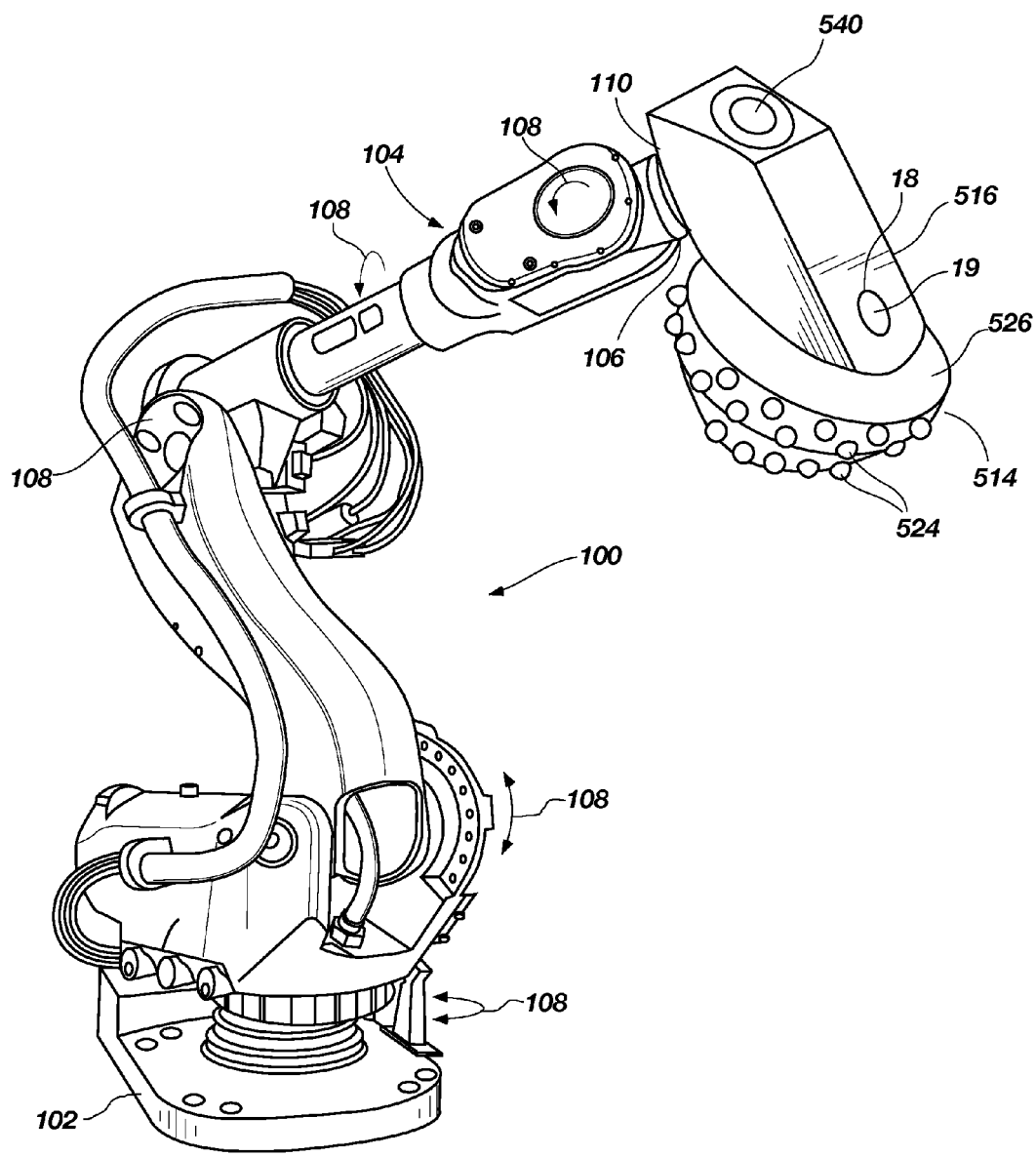
FIG. 3 is an isometric view of a robot manipulating a drill bit.
Figure 4:
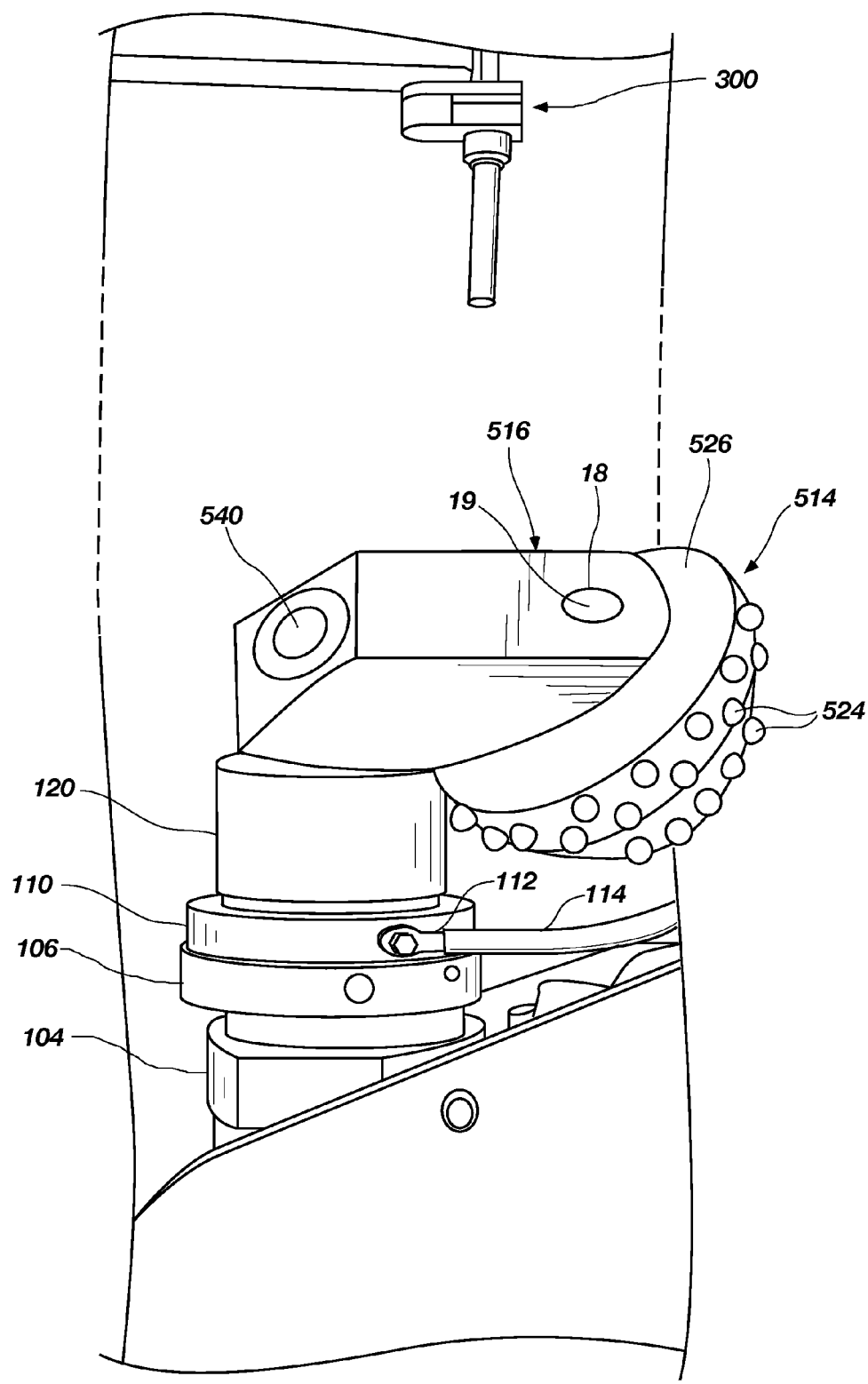
FIG. 4 is an isometric view of a leg of a drill bit positioned beneath a torch for welding.

FIGS. 3 and 4 are isometric views of robot 100 shown manipulating a bit leg 516 attached to adapter 110 on distal end 106 of articulated arm 104 of robot 100. As illustrated in FIG. 3, the several axes of rotation 108 provide sufficient degrees of freedom to permit vertical, horizontal, inverted, and rotated positioning of any portion of bit leg 516 during automated welding of ball plug 19 to the body of the bit leg 516 using the torch 300. As illustrated in FIG. 4, bit leg 516 may be positioned beneath torch 300 in preparation for the welding of ball plug 19 to the body of the bit leg 516 within the hole or passageway 18.

Adapter 110 is aligned by indicator with articulated arm 104. Adapter 110 is aligned to run substantially true with a programmable axis of movement of robot 100. A chuck 120 is attached to adapter 110 and indicator aligned to within 0.005 inch of true center rotation, or any desired amount. Bit leg 516 is held by chuck 120 and also centered by indicator alignment. Bit leg 516 may include grooves that permit location and calibration of the position of the end of torch 300.

As illustrated in FIG. 4, electrical ground cable 114 is electrically connected to adapter 110 by ground connector 112, a rotatable sleeve connector. Alternately, ground connector 112 is a brush connector. Ground cable 114 is supported by a tool balancer (not shown) to keep it away from the heat of bit leg 516 and the welding operations. Chuck 120 is attached to adapter 110. Bit leg 516 is held by chuck 120.

Robot arm 104 moves in response to program control from robot controller 130 and (or) PLC 150. As stated, torch 300 is mounted to positioner 200 having two controllable axes in a substantially vertical plane. As previously mentioned, a physical indicator, such as a notch or groove, may be formed on bit leg 516 to be engaged by torch 300 to ensure proper initial orientation between torch 300, robot arm 100, and bit leg 516. Additionally, at least one position indicator is electrically connected to PLC 150 for determining location and orientation of bit leg 516 and ball plug 19 therein to be welded using the robot 100.

After initial orientation and positioning, any transfer, plasma and shielding gas to be used are supplied to torch 300 by their respective sources 182, 186, 192, through their respective flow controllers 184, 188, 194.

Torch 300 is ignited by provision of current from pilot arc power source 170 and main arc power source 172. Igniting pilot arc circuit 330 reduces the resistance to an arc jumping between bit leg 516 and electrode 304 when voltage is applied to main arc circuit 332.

Flow of welding wire, weld rod, or hardfacing powder is provided by dosage system 160 dispensing controlled amounts of hardfacing powder into a conduit of flowing transport gas from transport gas source 182, having a flow rate controlled by flow controller 184. Then relative movement may be provided between the bit leg 516 and the torch 300 is obtained by movement of robot arm 100 and positioner 200, permitting automated welding of the ball plug 19 to the bit leg 516 using welding wire or welding rod in response to programming from robot controller 130 and PLC 150.

An imaging sensor 142 or camera 144 may be provided for identifying a specific bit leg 516 or portion thereof. The imaging sensor 142 or camera also may be used for measuring the ball plug 19 to be welded therein. A laser sensor 142 (FIG. 2) may also be provided for determining proximity of torch 300 to bit leg 516. Positioning and other programming parameters are correctable based on sensor 142 data acquisition and processing.

Robot controller 130 is primarily responsible for control of robot arm 100, while PLC 150 and data recorder 190 may provide sensor 142 data collection and processing, data analysis and process adjustment, adjustments in robot 100 movement, torch 300 movements, and torch 300 operation, including power, gas flow rates and material feed rates.

Figure 5:
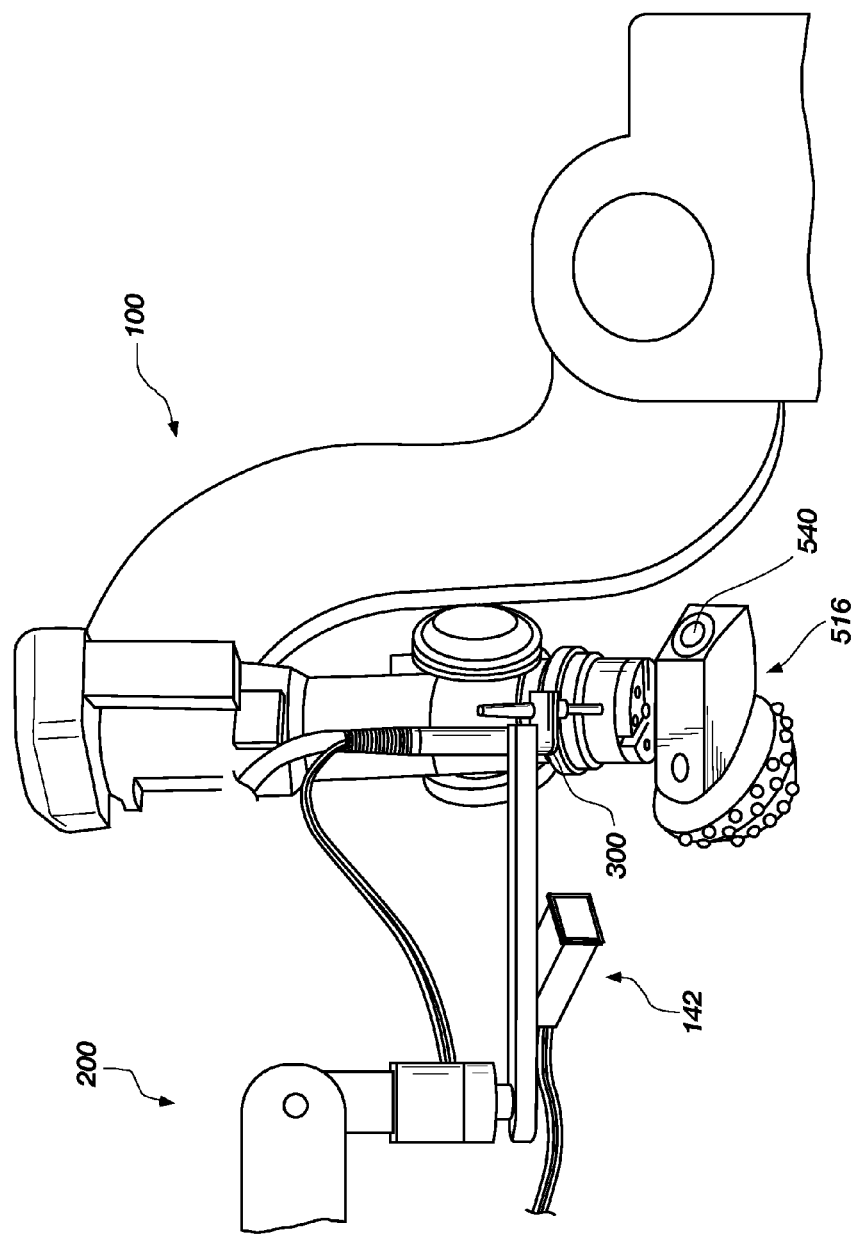
FIG. 5 is an isometric view of a chuck attached to the end of the robot.
Figure 5A:
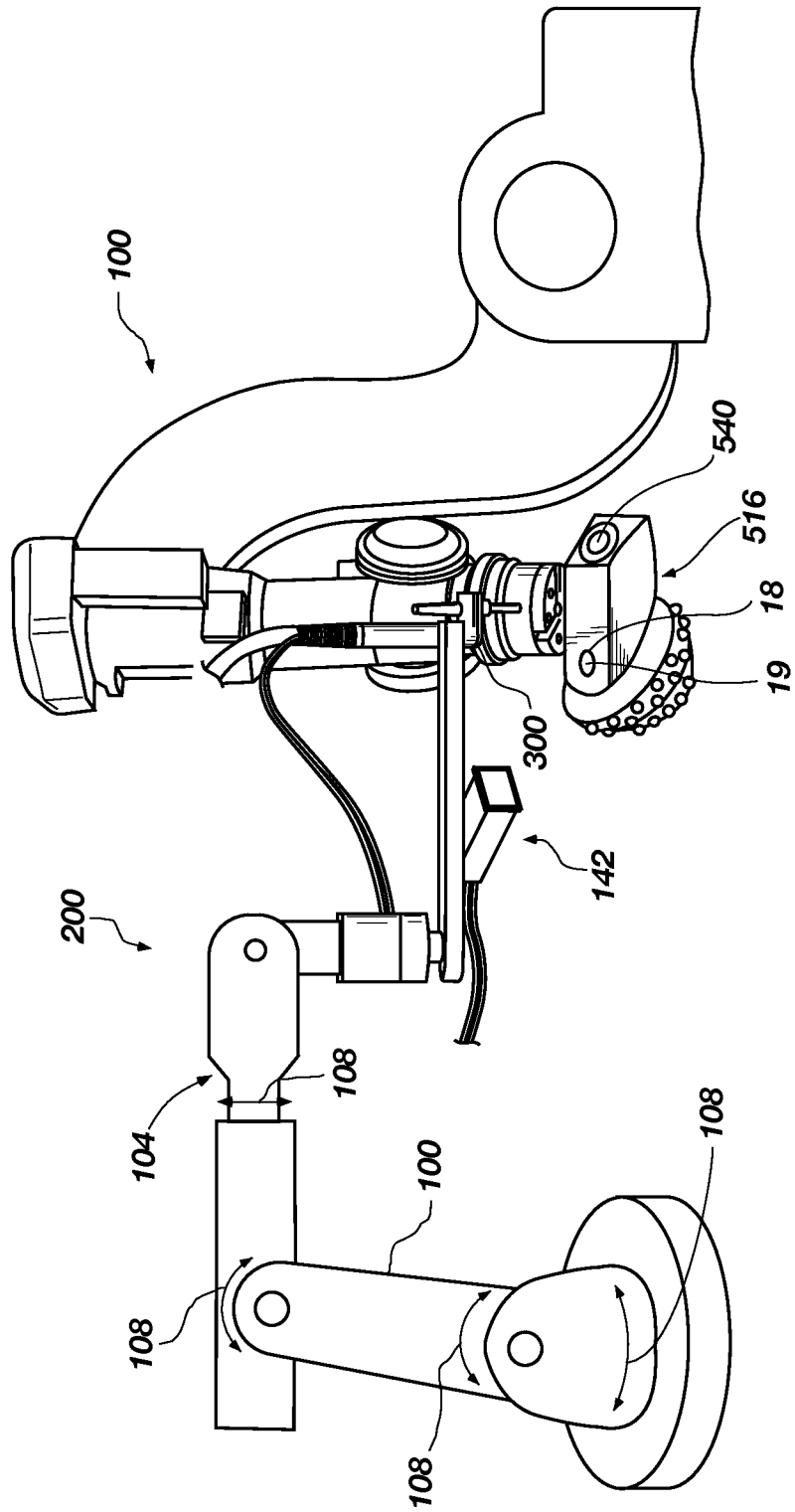
FIG. 5A is an isometric view illustrating a robot manipulating the torch and a robot manipulating a leg of a drill bit for welding.
Figure 6:
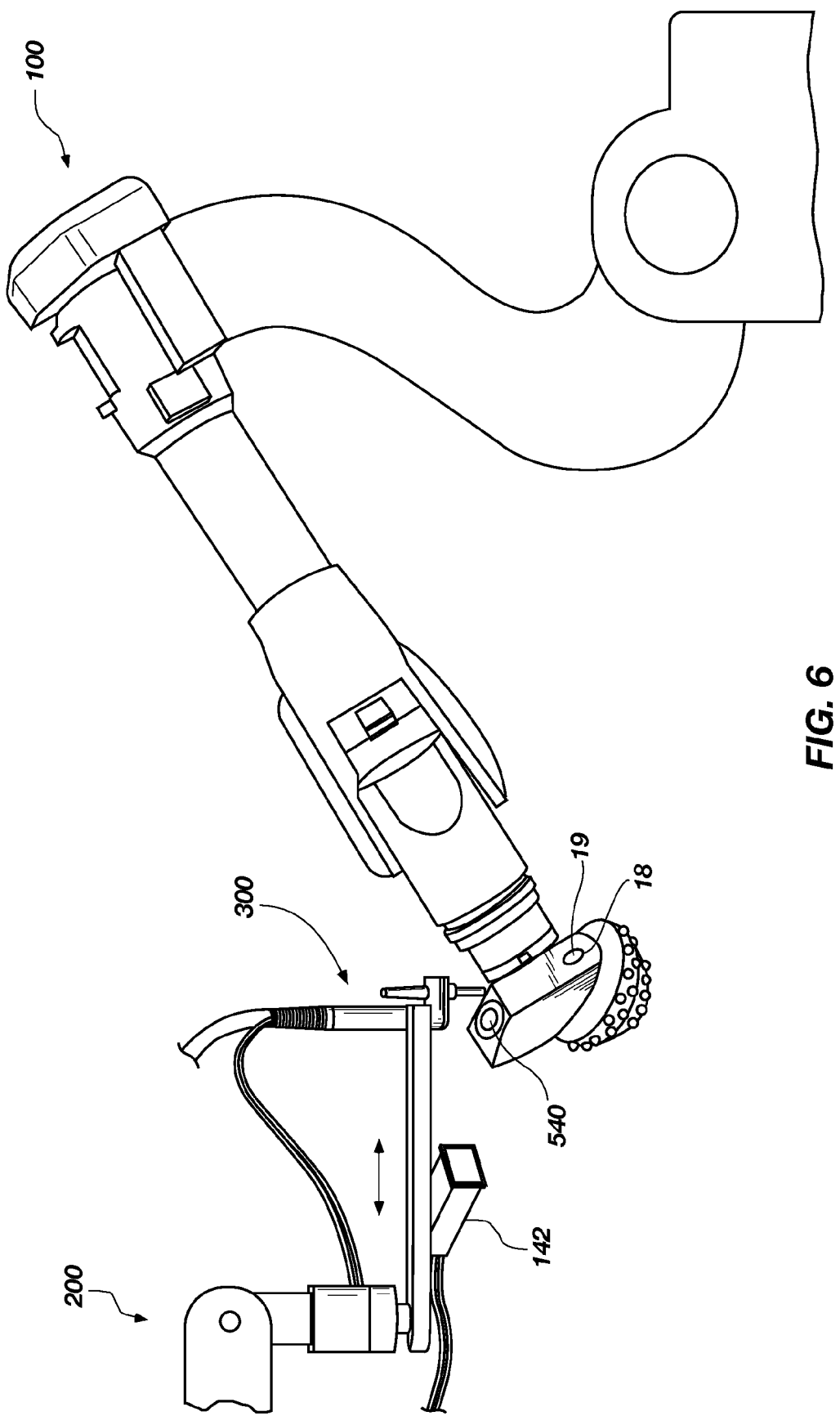
FIG. 6 is a side view illustrating a torch welding a ball plug to a leg of a drill bit.

FIGS. 5, 5A, and 6 illustrate robot 100 manipulating drill bit leg 516 into position to weld a ball plug 19 in a bit leg 516. As can be seen in FIG. 2 and in FIGS. 5, 5A, and 6, several axes of rotation 108 of robot arm 100 provide sufficient degrees of freedom to permit vertical, horizontal, inverted, and rotated positioning of bit leg 516 beneath torch 300, allowing torch 300 to access the various surfaces of bit leg 516.

Figure 2B:
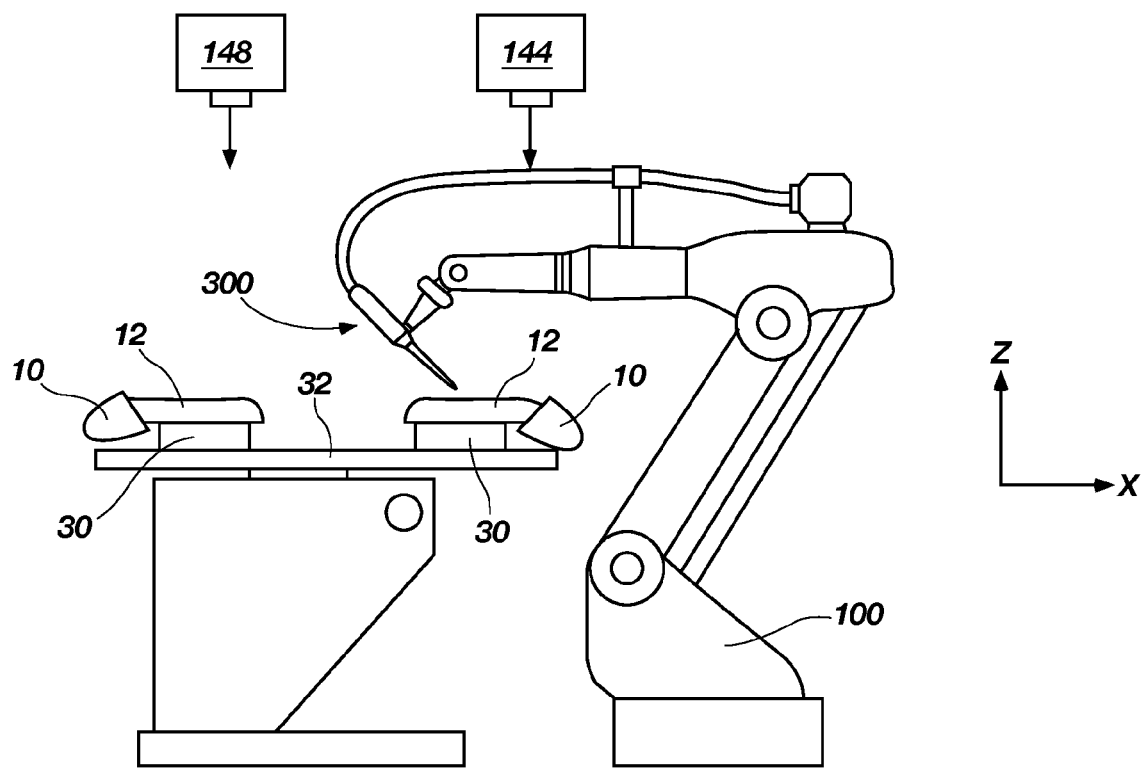
FIG. 2B is a side view of a robot and positioner that may be used to robotically weld a ball plug to a surface of a bit leg or bit body in accordance with embodiments of methods and systems of the present invention.

In additional embodiments of welding systems of the present invention, the torch 300 may be mounted to the end of an articulated arm of a multi-axis robot 100, as shown in FIG. 2B. One or more bit legs 12 (or bit bodies of a drill bit) may be mounted on a fixture 30 on a workpiece holder or positioner, such as a rotatable platen 32. The rotatable platen 32 may have a plurality of stations (e.g., six stations) mounted circumferentially around an upper rotatable surface of the platen 32, such that a plurality of bit bodies or bit legs 12 may be mounted on the rotatable surface of the platen 32.

Embodiments of welding systems of the present invention may comprise a first laser proximity sensor 148 (i.e., a laser range finder) or another type of distance sensor that is positioned, oriented, and configured for determining a location or position of a portion of a bit body or bit leg 12 (e.g., a ball plug 19) in at least one dimension of three-dimensional space. The laser proximity sensor 148 may be used for determining a position of a ball plug 19 in a bit body or bit leg 12 relative to at least one dimension in three-dimensional space, such as, for example, the Z-direction (i.e., the vertical direction with respect to the orientation of the gravitational field). For example, a distance between a surface of a platen 32 and a ball plug 19 in a bit body or bit leg 12 mounted over the surface of the rotatable platen 32 may be determined using the laser proximity sensor 148, or a distance between a ball plug 19 in a bit body or bit leg 12 and the laser proximity sensor 148 itself may be determined using the first position sensor. Information relating to the position of the ball plug 19 relative to the at least one dimension in three-dimensional space (e.g., a distance between the ball plug 19 and a reference point in three-dimensional space) may be sent electronically to the sensor controller 140 and/or the robot controller 130 (FIGS. 2 and 2A).

Embodiments of welding systems of the present invention also may comprise a camera 144 for determining a position of the ball plug 19 and/or a size of a ball plug 19 in a bit body or a bit leg 12. For example, a camera 144 may be used to take a picture or image of the ball plug 19 in the bit body or bit leg 12, and the sensor controller 140 and/or the robot controller 130 may be configured under control of a computer program to electronically analyze the picture or image, identify a boundary of the ball plug 19 in the picture or image, and to measure an average diameter of the ball plug 19 using the picture or image. The sensor controller 140 and/or the robot controller 130 may further be configured under control of a computer program to determine a location of the center of the ball plug 19 such as, for example, a location of the center of the ball plug 19 in the XY plane (i.e., the plane oriented transverse to the Z-axis and the gravitational field). Information relating to the position of the center of the ball plug 19 (e.g., a location of the center of the ball plug 19 in the XY plane) and the size (e.g., average diameter) of the ball plug 19 may be sent electronically to the sensor controller 140 and/or the robot controller 130 of the welding system.

After the position of the ball plug 19 in three-dimensional space has been determined, and after a size of the ball plug 19 has been determined, the sensor controller 140 and/or the robot controller 130 of the welding system may be used to identify and select an appropriate welding computer program from a predefined set of welding computer programs (each of which may be configured for use in welding different sizes of ball plugs 19, such as different sized ball plugs 19 used in different sized bit bodies or bit legs 12). The selected welding computer program then may be used to control movement of the robot 100 and the torch 300 attached thereto to weld an interface between a ball plug 19 and the surrounding surfaces of the bit body or bit leg 12. In additional embodiments, the selected welding program may be used to control movement of the robot 100 and the torch 300 attached thereto to build up a ball plug 19 in the access hole 18 for the ball bearings at least partially from filler material deposited during the welding process. In other words, a prefabricated ball plug may not be positioned in the hole 18 and welded to the bit body or bit leg 12, but rather the ball plug 19 may be at least substantially entirely formed during the welding process in some embodiments of the invention.

In some embodiments of the present invention, the welding torch 300 may be caused to perform a single rotational welding pass circumferentially three hundred and sixty degrees around the ball plug 19, to then allow the ball plug 19 and bit leg 12 to cool, and then to later perform one or more additional rotational welding passes circumferentially three hundred and sixty degrees around the ball plug 19 to complete the welding process. For example, a pre-fabricated ball plug 19 may be recessed within the ball access hole 18 prior to welding. The welding process may be used to weld the pre-fabricated ball plug 19 to the surrounding surfaces of the bit body or bit leg 12, and filler material deposited during the welding process may be deposited within the recess to at least substantially fill the recess until it is at least generally flush with the outer surface of the bit body or bit leg 12.

In some embodiments of the present invention, the welding torch 300 may comprise a metal inert gas (MIG) welding torch having a consumable electrode. In other embodiments, the welding torch 300 may comprise a tungsten inert gas (TIG) welding torch having a non-consumable electrode. In yet additional embodiments, the welding torch 300 may comprise a plasma transferred arc (PTA) welding torch.

As previously discussed, filler material may be deposited in some embodiments of the present invention. The filler material may comprise a metal material such as, for example, an INCONEL® metal alloy (e.g., a nickel-based metal alloy containing approximately 60% nickel by weight, and further including chromium, molybdenum, and niobium). In additional embodiments, the filler material may comprise any one of an iron-based alloy (e.g., a steel alloy), a cobalt-based alloy, or a nickel-based alloy.

Figure 2C:
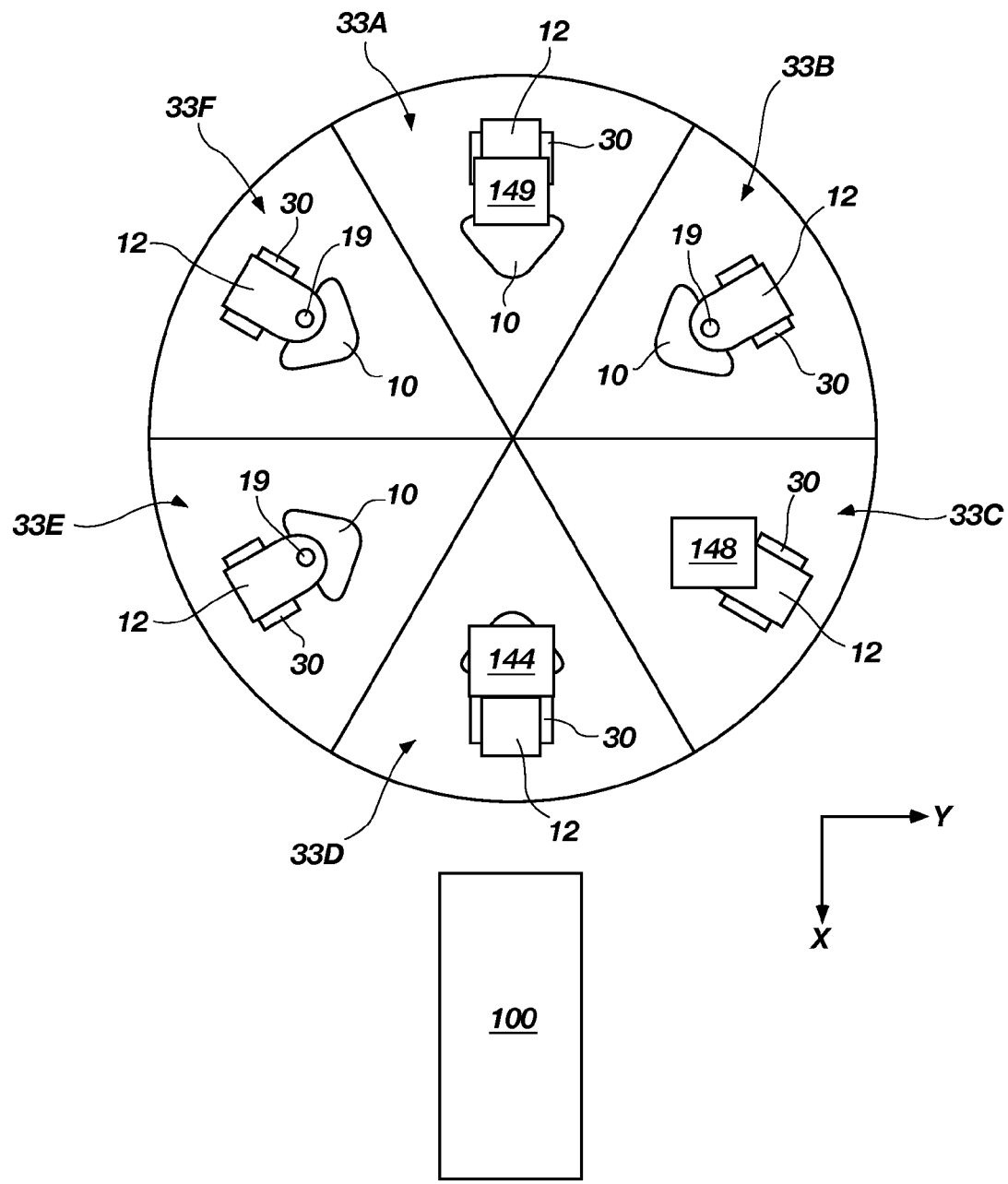
FIG. 2C is a top plan view of the positioner shown in FIG. 2B and illustrates a plurality of bit legs on the positioner at different stations or locations.

FIG. 2C is a top plan view of the rotatable platen 32. In some embodiments, a plurality of work stations, such as the six work stations 33A, 33B, 33C, 33D, 33E, and 33F shown in FIG. 2C, may be provided on the platen 32. Each work station may include a jig or fixture 30, or a robot 100 such as described in FIG. 2, FIG. 2A, FIG. 3, FIG. 5, FIG. 5A, and FIG. 6, for supporting a bit leg 12 or bit body of a drill bit 1 thereon during a welding process. In other embodiments, the platen 32 may include more or less work stations. The robot 100 used for welding the plug in the bit leg 12, which is represented schematically in FIG. 2C, may be positioned beside the platen 32. The camera 144 may be positioned over the platen 32 at a position relative to the platen 32 and the robot 100 such that, when the platen 32 is rotated to a position in which a bit leg 12 in a particular work station (e.g., the work station 33D, as shown in FIG. 2C) is situated for welding of the ball plug 19 to the bit leg 12 by the robot 100, the camera 144 is positioned and oriented to acquire a picture or image of the ball plug 19 in or on the bit leg 12 for locating a position of the ball plug 19 and determining or identifying a size of the ball plug 19. The laser proximity sensor 148, which may be used to determine a position of the bit legs or ball plugs therein in at least one dimension in three-dimensional space as previously described, may be positioned and oriented to measure a location of a bit leg 12 or ball plug 19 in a work station that is positioned other than at a position for welding by the robot 100. For example, when the platen 32 is rotated for welding of a ball plug 19 in workstation 33D, the laser proximity sensor 148 may be positioned and oriented to measure a location of a bit body 12 or ball plug 19 in any one of work stations 33A, 33B, 33C, 33E, or 33F. As shown in FIG. 2C, when the platen 32 is rotated for welding of a ball plug 19 in workstation 33D, the laser proximity sensor 148 may be positioned and oriented to measure a location of a bit body 12 or ball plug 19 in work station 33C, for example.

Furthermore, the platen 32 may be situated in a work environment such that an operator of the system places bit legs 12 or bit bodies of drill bits 1 onto the fixtures 30 in the work stations 33A-33F in preparation for welding from a particular position relative to the robot 100. For example, the platen 32 may be situated in a work environment such that an operator of the system places bit legs 12 or bit bodies of drill bits 1 onto the fixtures 30 in the work stations 33A-33F in preparation for welding from a side of the platen 32 opposite the robot 100. Referring to FIG. 2C, if the platen is rotated such that work station 33D is positioned for welding by the robot 100, as shown therein, an operator may load bit legs 12 or bit bodies of drill bits 1 onto the fixtures 30 on the platen 32 in the space corresponding to the location of work station 33A in FIG. 2C. In some embodiments of the present invention, a laser pointer 149 may be positioned vertically over the platen 32 and oriented to direct a laser beam down toward the platen 32 at an intended location of a center of a ball plug 19 for welding by the robot 100. In other words, the laser pointer 149 may be used to assist an operator in roughly positioning and orienting a bit leg 12 (and the ball plug 19 on or in the bit leg 12) on a fixture 30 prior to welding by the robot 100. As the operator positions the bit leg 12 on the fixture 30, a dot produced by the laser beam emitted by the laser pointer 149 will be visible to the operator on a surface of the bit leg 12 or the ball plug 19. The operator then may adjust a position of the bit leg 12 on the fixture 30 until the dot is located at roughly the center of the ball plug 19 (or some other predefined or preselected feature of the ball plug 19 or the bit leg 12).

With continued reference to FIG. 2C, in the configuration shown therein, after a user loads a bit leg 12 onto a fixture 30 in a work station 33A-33F with the assistance of the laser pointer 149, as discussed above, that bit leg 12 will subsequently be positioned for measurement using the laser proximity sensor 148 prior to welding. After the laser proximity sensor 148 (e.g., laser range finder) measures a location of the ball plug 19 along the Z-axis, the bit leg 12 will subsequently be rotated into position for welding. At the position for welding, but prior to welding, the camera 144 may acquire an image or picture of the ball plug 19. The information obtained from the laser proximity sensor 148 regarding the position of the ball plug 19 along the Z-axis may be used to properly focus the camera 144 prior to acquiring the image or picture of the ball plug 19. After acquiring the image or picture of the ball plug 19 using the camera 144, a computer device may be configured under control of a computer program to analyze the picture or image to identify a center and circumferential edge or boundary of the ball plug, this information may be used to identify or determine a size (e.g., average diameter) of the ball plug 19, and to identify or determine a location of the ball plug 19 in the XY plane, as previously discussed herein. Using this information, the robot controller 130 (FIGS. 2 and 2A) may be used to select a an appropriate welding computer program for welding the particular size of the ball plug 19, and to properly adjust the positional parameters in the welding computer program (which are used to properly position the welding torch 300 in three-dimensional space during the welding process) for the actual position of the ball plug 19 in three-dimensional space, which serves to account for variations in positioning of the bit legs 12 on the fixtures. The robot 100, under control of the properly selected and adjusted welding computer program, may be caused to automatically and robotically weld the ball plug 19 to the surrounding surfaces of the bit leg 12.

In some embodiments, cooling gas may be directed onto selected locations of the bit leg 12 during the welding process to prevent overheating of pressure sensitive elements or components of the drill bit (such as, for example, polymeric bearing seals).

In some embodiments, each work station 33A-33F may be loaded with bit legs 12 prior to welding any of the ball plugs 19 thereof. In other embodiments, an operator may be unloading a previously welded bit leg 12 from a fixture and loading another bit leg 12 in the fixture 30 for welding as other ball plugs 19 are being measured by the laser proximity sensor 148 and the camera 144 and/or being welded by the robot 100. Furthermore, as previously mentioned, in some embodiments, the robot may be configured to perform a single welding pass on the ball plug 19 of each of the bit legs 12 in each of the work stations 33A-33F prior to performing a second welding pass on any of the ball plugs 19, which may allow the bit legs 12 and ball plugs 19 to cool between welding passes, thereby preventing any damage to the ball plugs 19 and/or bit legs 12 that might occur due to overheating were the ball plugs 19 to be completely welded with multiple welding passes in a single uninterrupted sequence.

As the terms are used in this specification and claims, the words "generally" and "substantially" are used as descriptors of approximation, and not words of magnitude. Thus, they are to be interpreted as meaning "largely, but not necessarily entirely."

It will be readily apparent to those skilled in the art that the general principles defined herein may be applied to other embodiments and applications without departing from the spirit and scope of the present invention.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

What is claimed is:

1. A system for robotically welding a ball plug of a drill bit comprising:
    a robot having a program controllable articulated arm connected to a torch secured thereto, the robot programmed to position the torch relative to a surface of a pre-fabricated ball plug positioned in a hole in at least a portion of a drill bit prior to welding the ball plug to the at least a portion of the drill bit;
    a plurality of workpiece positioners mounted on a rotatable platen comprising a plurality of stations located circumferentially around an upper surface of the rotatable platen, each station of the plurality of stations comprising a workpiece positioner of the plurality of workpiece positioners for mounting the at least a portion of the drill bit on a respective workpiece positioner of the plurality of workpiece positioners;
    at least one sensor configured to determine a position of the ball plug relative to at least one reference point in at least one dimension in three-dimensional space; and
    a programmable control system electrically connected to the robot and the at least one sensor, the programmable control system being programmed to complete a first weld pass on each ball plug located adjacent surfaces of each drill bit in their respective stations of the plurality of stations before robotically making a second weld pass on any ball plug.

2. A system for robotically welding a ball plug of a drill bit comprising:
    a robot having a program controllable articulated arm connected to a torch secured thereto, the robot programmed to position the torch relative to a surface of a pre-fabricated ball plug positioned in a hole in at least a portion of a drill bit prior to welding the ball plug to the at least a portion of the drill bit;
    a plurality of workpiece positioners mounted on a rotatable platen comprising a plurality of stations located circumferentially around an upper surface of the rotatable platen, each station of the plurality of stations comprising a workpiece positioner of the plurality of workpiece positioners for mounting the at least a portion of the drill bit on a respective workpiece positioner of the plurality of workpiece positioners;
    a first sensor configured to determine a position of the ball plug relative to at least one reference point in at least one dimension in three-dimensional space;
    a second sensor configured to determine a size of the ball plug; and
    a programmable control system electrically connected to the robot, the first sensor, and the second sensor and configured to cause the robot to robotically weld the ball plug to the at least a portion of the drill bit, the programmable control system being programmed to complete a first weld pass on each ball plug located adjacent surfaces of each drill bit in their respective stations of the plurality of stations before robotically making a second weld pass on any ball plug.

3. The system of claim 2, wherein the second sensor is further configured to determine a position of the ball plug relative to at least one reference point in at least one dimension in three-dimensional space.

4. The system of claim 2, further wherein the second sensor comprises a camera configured to acquire an image of the ball plug.

5. The system of claim 2, wherein the torch comprises a metal inert gas (MIG) welding torch.

6. The system of claim 2, wherein the torch is configured to deposit a filler material during welding.

7. The system of claim 6, wherein the filler material comprises at least one of an iron-based metal alloy, a nickel-based metal alloy, and a cobalt-based metal alloy.

8. The system of claim 2, wherein the first sensor comprises a laser range finder.

9. The system of claim 2, wherein the programmable control system is configured under control of a computer to select a predefined welding computer program from a plurality of predefined welding computer programs using the position of the ball plug and the size of the ball plug, and to use the selected predefined welding computer program to control the robot and the torch and to weld the ball plug to the at least a portion of the drill bit.

10. A system for robotically welding a ball plug to a leg of a drill bit comprising:
    a first robot having a program controllable articulated arm connected to a torch secured thereto, the robot programmed to position the torch relative to a surface of a ball plug positioned within a passageway defined by a leg of a drill bit prior to welding the ball plug to the leg of the drill bit;
    a first sensor configured to determine a position of the ball plug relative to at least one reference point in at least one dimension in three-dimensional space;
    a second sensor configured to determine a size of the ball plug;
    a plurality of workpiece positioners mounted on a rotatable platen comprising a plurality of stations located circumferentially around an upper surface of the rotatable platen, each station of the plurality of stations comprising a workpiece positioner of the plurality of workpiece positioners for mounting the leg of the drill bit on a respective workpiece positioner of the plurality of workpiece positioners;
    a second robot having a program controllable articulated arm comprising a chuck configured to support a ball plug mounted to the chuck, the second robot programmed to position the ball plug in a predetermined orientation relative to a surface of the leg of the drill bit prior to welding the ball plug to the leg of the drill bit; and a programmable control system electrically connected to the first robot, the second robot, the first sensor, and the second sensor and configured to cause the first robot to robotically weld the ball plug to the leg of the drill bit, the programmable control system being programmed to cause the robot to perform a single welding pass on the ball plug located at each station of the plurality of stations before performing a second welding pass on any ball plug located at any station of the plurality of stations.

11. The system of claim 10, wherein the second sensor is further configured to determine a position of the ball plug relative to at least one reference point in at least one dimension in three-dimensional space.

12. The system of claim 10, wherein the second sensor comprises a camera configured to acquire an image of the ball plug.

13. The system of claim 10, wherein the torch comprises a metal inert gas (MIG) welding torch.

14. The system of claim 10, wherein the programmable control system is configured under control of a computer to select a predefined welding computer program from a plurality of predefined welding computer programs using the position of the ball plug and the size of the ball plug, and to use the selected predefined welding computer program to control the robot and the torch and to weld the ball plug to the leg of the drill bit.

15. A system for robotically welding a ball plug in a ball plug hole of a drill bit comprising:

a robot having a program controllable articulated arm connected to a torch secured thereto, the robot programmed to position the torch relative to a surface of at least a portion of a drill bit prior to welding a ball plug in a ball plug hole of the at least a portion of the drill bit;

a plurality of workpiece positioners mounted on a rotatable platen comprising a plurality of stations located circumferentially around an upper surface of the rotatable platen, each station of the plurality of stations comprising a workpiece positioner of the plurality of workpiece positioners for mounting the at least a portion of the drill bit on a respective workpiece positioner of the plurality of workpiece positioners;

a first sensor configured to determine a position of the ball plug hole relative to at least one reference point in at least one dimension in three-dimensional space;

a second sensor configured to determine a size of the ball plug hole; and a programmable control system electrically connected to the robot, the first sensor, and the second sensor and configured to cause the robot to robotically weld a ball plug in the ball plug hole of the at least a portion of the drill bit, the programmable control system being programmed to cause the robot to perform a single welding pass on the ball plug located at each station of the plurality of stations before performing a second welding pass on any ball plug located at any station of the plurality of stations.

16. The system of claim 15, wherein the second sensor is further configured to determine a position of the ball plug hole relative to at least one reference point in at least one dimension in three-dimensional space.

17. The system of claim 15, wherein the second sensor comprises a camera configured to acquire an image of the ball plug.

18. The system of claim 15, wherein the programmable control system is configured under control of a computer to select a predefined welding computer program from a plurality of predefined welding computer programs using the position of the ball plug and the size of the ball plug, and to use the selected predefined welding computer program to control the robot and the torch and to weld the ball plug to the at least a portion of the drill bit.

19. The system of claim 15, further comprising a robot having program controllable movement of an articulated arm, the arm including a chuck adapter attached thereto for holding the ball plug in any desired position to weld the ball plug to the drill bit.

20. A method for welding a ball plug to a drill bit comprising:

robotically making a first weld pass on a ball plug located adjacent surfaces of a drill bit, the drill bit being mounted on a workpiece positioner in one station of a plurality of stations mounted circumferentially around an upper rotatable surface of a rotatable platen, each station of the plurality of stations including a workpiece positioner configured for mounting a respective drill bit on the workpiece positioner;

before robotically making a second weld pass on the ball plug, completing a first weld pass on each other ball plug located adjacent surfaces of each other drill bit in their respective stations of the plurality of stations; and robotically making at least a second weld pass on at least one ball plug to complete welding of each ball plug to the adjacent surfaces of a respective drill bit.

21. The method of claim 20, further comprising:

using the robot to position a welding torch relative to a surface of a pre-fabricated ball plug positioned in a hole in a drill bit prior to making the first weld pass;

determining a position of the ball plug relative to at least one reference point in at least one dimension in three-dimensional space using at least one sensor; and selecting a predefined welding computer program from a plurality of predefined welding computer programs using the position of the ball plug.

22. A method for robotically welding a ball plug to a leg of a drill bit comprising:

positioning a torch connected to a controllable articulated arm of a robot having a program controlling the articulated arm, the torch positioned relative to a surface of a ball plug positioned within a passageway defined by a leg of a drill bit prior to welding the ball plug within the passage defined by the leg of the drill bit, the leg of the drill bit being mounted on a workpiece positioner of a plurality of workpiece positioners, the workpiece positioner of the plurality of workpiece positioners being located in one station of a plurality of stations mounted circumferentially around an upper surface of a rotatable platen, each station of the plurality of stations including a workpiece positioner of the plurality of workpiece positioners configured for mounting a respective leg of a respective drill bit on a respective workpiece positioner of the plurality of workpiece positioners;

determining a position of the ball plug relative to at least one reference point in at least one dimension in three-dimensional space using a first sensor;

determining the size of the ball plug using a second sensor;

performing a first weld pass on the ball plug adjacent to the leg of the drill bit using a programmable control system electrically connected to the robot, the first sensor, and the second sensor to control the robot;

before robotically performing a second weld pass on the ball plug, completing a first weld pass on each other ball plug located adjacent surfaces of each other leg of each other drill bit in their respective stations of the plurality of stations; and performing at least a second weld pass on each ball plug to complete welding of each ball plug to the adjacent surfaces of the respective leg of the respective drill bit.

23. The method of claim 22, further comprising:

determining a position of the ball plug relative to at least one reference point in at least one dimension in three-dimensional space using the second sensor.

24. The method of claim 22, further comprising:

acquiring an image of the ball plug using a camera.

25. The method of claim 22, further comprising:

depositing filler material during welding using a torch.

26. The method of claim 22, further comprising:

selecting a predefined welding computer program from a plurality of predefined welding computer programs using the position of the ball plug and the size of the ball plug; and controlling the robot and the torch using the selected predefined welding computer program to weld the ball plug to the leg of the drill bit.

27. The method of claim 22, further comprising:

manually mounting the ball plug and the leg of the drill bit on a workpiece positioner in a station of the plurality of stations on the rotatable platen.

28. The method of claim 22, further comprising:

holding the ball plug in any desired position to weld the ball plug to the leg of the drill bit using a robot having program controllable movement of an articulated arm, the arm including a chuck adapter attached thereto for holding the ball plug.

* * * * *